US012802376B2

(12) United States Patent
Tian et al.

(10) Patent No.: US 12,802,376 B2
(45) Date of Patent: Nov. 17, 2026

(54) VIRTUAL OBJECT SUIT PROCESSING METHODS AND SYSTEMS

(71) Applicant: Tencent Technology (Shenzhen) Company Limited, Shenzhen (CN)

(72) Inventors: Cong Tian, Shenzhen (CN); Jieqi Xie, Shenzhen (CN); Boyi Liu, Shenzhen (CN); Weijian Cui, Shenzhen (CN); Yu Deng, Shenzhen (CN); Zhi Li, Shenzhen (CN); Jingjing He, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 140 days.

(21) Appl. No.: 18/770,396

(22) Filed: Jul. 11, 2024

(65) Prior Publication Data

US 2024/0362882 A1 Oct. 31, 2024

Related U.S. Application Data

(63) Continuation of application No. PCT/CN2023/088657, filed on Apr. 17, 2023.

(30) Foreign Application Priority Data

Jun. 14, 2022 (CN) ......................... 202210671738.5

(51) Int. Cl.
*G06T 19/20* (2011.01)
*A63F 13/63* (2014.01)
(Continued)

(52) U.S. Cl.
CPC ............. *G06T 19/20* (2013.01); *A63F 13/63* (2014.09); *G06T 3/40* (2013.01); *G06T 7/10* (2017.01);
(Continued)

(58) Field of Classification Search
None
See application file for complete search history.

(56) References Cited

U.S. PATENT DOCUMENTS 5,423,554 A 6/1995 Davis
2009/0132135 A1* 5/2009 Quinn, Jr. ........... F16H 61/6649 701/55
2016/0026926 A1* 1/2016 Yeung .................... G06N 20/00 706/12

FOREIGN PATENT DOCUMENTS

CN 104981830 A 10/2015
CN 109087369 A 12/2018
(Continued)

OTHER PUBLICATIONS

Machine Translated Chinese patent publication CN-113476849 published Jan. 8, 2021 (Year: 2021).*
(Continued)

*Primary Examiner* — Tapas Mazumder
(74) *Attorney, Agent, or Firm* — Banner & Witcoff, Ltd.

(57) ABSTRACT

This application provides a suit processing method and apparatus for a virtual object, an electronic device, and a storage medium. The method includes displaying a virtual scene, the virtual scene including a first virtual object wearing a first suit, the first suit including a plurality of components being distributed at different positions on the first virtual object; to determining that a color of the first region does not match a color of the first component; and in response to the determining, replacing a first component in the first suit with a second component, a color of the second component matching the color of the first region, and a wearing position for the second component is the same as that for the first component.

20 Claims, 17 Drawing Sheets

(51) Int. Cl.
*G06T 3/40* (2006.01)
*G06T 7/10* (2017.01)
*G06T 7/90* (2017.01)

(52) U.S. Cl.
CPC ...... *G06T 7/90* (2017.01); *G06T 2207/10024* (2013.01); *G06T 2219/2012* (2013.01)

(56) References Cited

FOREIGN PATENT DOCUMENTS

| | | | | | |
|---|---|---|---|---|---|
| CN | 110681157 | A | | 1/2020 | |
| CN | 111494939 | A | | 8/2020 | |
| CN | 111672112 | A | | 9/2020 | |
| CN | 111870950 | A | | 11/2020 | |
| CN | 113426107 | A | | 9/2021 | |
| CN | 113476849 | A | * | 10/2021 | ............ A63F 13/63 |
| KR | 20140108449 | A | | 9/2014 | |

OTHER PUBLICATIONS

International Search Report and Written Opinion dated Aug. 6, 2023 for PCT/CN2023/088657.

Mar. 25, 2026—CN First Office Action—CN Application No. 202210671738.5.

* cited by examiner

VIRTUAL OBJECT SUIT PROCESSING METHODS AND SYSTEMS

RELATED APPLICATION

This application is a continuation of PCT Application No. PCT/CN2023/088657 filed on Apr. 17, 2023, which claims priority to Chinese Patent Application No. 202210671738.5 filed on Jun. 14, 2022, each of which are entitled "Suit Processing Method and Apparatus for Virtual Object, Electronic Device, Storage Medium, and Program Product", and each of which is incorporated by reference in its entirety.

TECHNICAL FIELD

This disclosure relates to computer technologies, and in particular, to a suit processing method and apparatus for a virtual object, an electronic device, a storage medium, and a program product.

BACKGROUND

A display technology based on graphics processing hardware extends channels for sensing an environment and obtaining information. A display technology for a virtual scene can implement diverse interactions between virtual objects controlled by users or artificial intelligence according to actual application requirements, and has various typical application scenarios. For example, in a virtual scene of a game, a process of a real battle between virtual objects can be simulated.

A virtual object may wear various suits (for example, game appearance or game equipment) in a virtual scene. During a game battle, a player cannot spare much time or energy to match a suit. Currently, no solution for quick suit changes is available.

SUMMARY

Aspects of this application provide a suit processing method and apparatus for a virtual object, an electronic device, a computer-readable storage medium, and a computer program product, to improve suit change efficiency for a virtual object in a virtual scene.

Technical solutions described herein may include the following.

One or more aspects of this application provide a suit processing method for a virtual object. The method may be performed by an electronic device, and comprises:

- causing to be displayed a virtual scene, the virtual scene comprising a first virtual object located in a first region and wearing a first suit, the first suit comprising a plurality of components distributed at different positions on the first virtual object;
- determining that a color of the first region does not match a color of a first component of the plurality of components of the first suit; and
- replacing, in response to the determining, the first component in the first suit with a second component, wherein the second component is selected based on a color of the second component matching the color of the first region, and a second wearing position of the second component being the same as a first wearing position of the first component.

One or more aspects of this application provide a suit processing apparatus for a virtual object, comprising:

- a display module, configured to output for display a virtual scene, the virtual scene including a first virtual object wearing a first suit, the first suit including a plurality of components, and the plurality of components being distributed at different positions on the first virtual object; and
- a suit switching module, configured to:
  - determine that a color of the first region does not match a color of a first component of the plurality of components of the first suit; and
  - replace, in response to the determining, the first component in the first suit with a second component, wherein the second component is selected based on a color of the second component matching the color of the first region, and a second wearing position of the second component being the same as a first wearing position of the first component.

One or more aspects of this application provide an electronic device, comprising:

- one or more processors; and
- memory storing computer-readable instructions that, when executed by the one or more processors, cause the electronic device to:
- cause to be displayed a virtual scene, the virtual scene comprising a first virtual object located in a first region and wearing a first suit, the first suit comprising a plurality of components distributed at different positions on the first virtual object;
- determine that a color of the first region does not match a color of a first component of the plurality of components of the first suit; and
- replace, in response to the determining, the first component in the first suit with a second component, wherein the second component is selected based on a color of the second component matching the color of the first region, and a second wearing position of the second component being the same as a first wearing position of the first component.

One or more aspects of this application provide one or more non-transitory computer-readable storage medium storing executable instructions that, when executed by one or more processors, cause the one or more processors to:

- cause to be displayed a virtual scene, the virtual scene comprising a first virtual object located in a first region and wearing a first suit, the first suit comprising a plurality of components distributed at different positions on the first virtual object;
- determine that a color of the first region does not match a color of a first component of the plurality of components of the first suit; and
- replace, in response to the determining, the first component in the first suit with a second component, wherein the second component is selected based on a color of the second component matching the color of the first region, and a second wearing position of the second component being the same as a first wearing position of the first component.

One or more aspects of this application provide a computer program product storing executable instructions that, when executed by one or more processors, cause the one or more processors to:

- cause to be displayed a virtual scene, the virtual scene comprising a first virtual object located in a first region and wearing a first suit, the first suit comprising a plurality of components distributed at different positions on the first virtual object;

determine that a color of the first region does not match a color of a first component of the plurality of components of the first suit; and replace, in response to the determining, the first component in the first suit with a second component, wherein the second component is selected based on a color of the second component matching the color of the first region, and a second wearing position of the second component being the same as a first wearing position of the first component.

The following beneficial effects may be achieved as a result of one or more aspects described herein:

At least some components in a suit of a virtual object are replaced with a component that matches an environmental color of a virtual scene. In this way, a component in the suit of the virtual object automatically changes with a color of a scene in a game, a possibility of the virtual object being exposed in the virtual scene is reduced, and interference of a suit component on interaction of the virtual object is reduced without operation costs or thinking costs of a user, so that the user can focus on an interaction process in the virtual scene, and operation efficiency is improved.

DETAILED DESCRIPTION

Figure 1A:
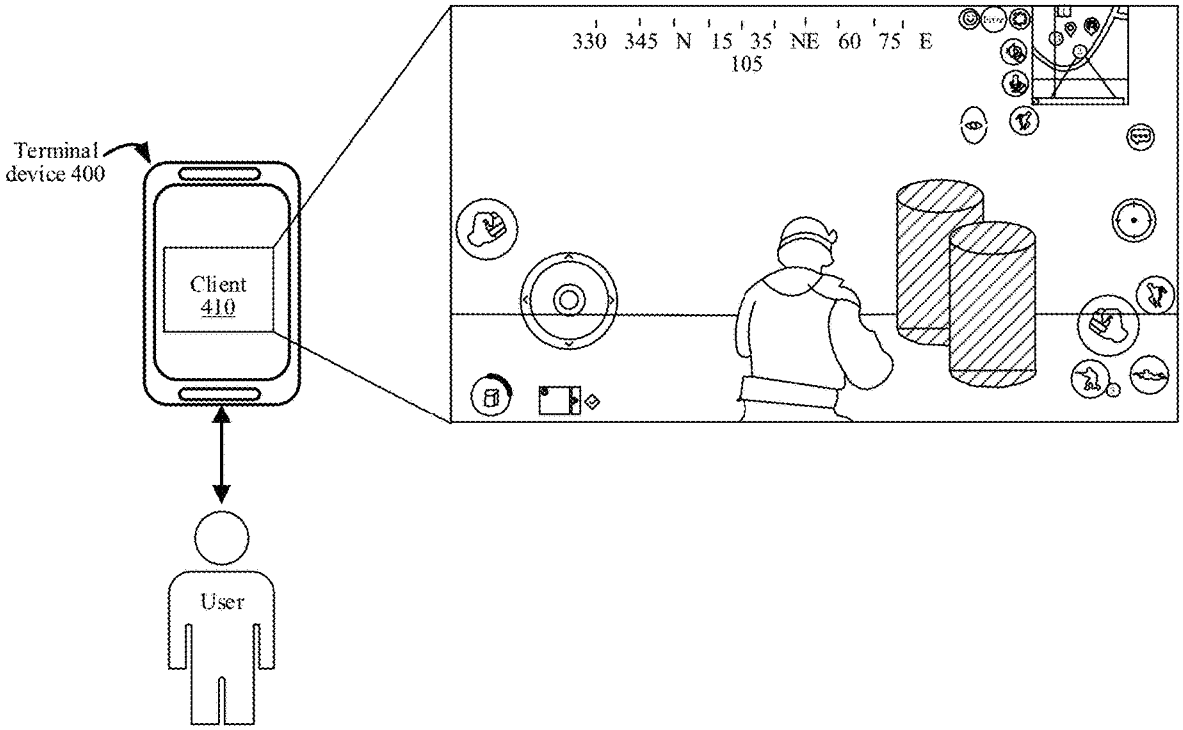
FIG. 1A is a schematic diagram of an application mode of a suit processing method for a virtual object according to one or more aspects described herein.

To make the objectives, technical solutions, and advantages of this disclosure clearer, the following describes this disclosure in further detail with reference to the accompanying drawings. The described aspects are not to be considered as a limitation to this disclosure. All other aspects obtained by a person of ordinary skill in the art without creative efforts shall fall within the protection scope of this disclosure.

In the following descriptions, the term "some aspects" describes subsets of all possible aspects, but "some aspects" may be the same subset or different subsets of all the possible aspects, and can be combined with each other without conflict.

In the following descriptions, the terms "first", "second", and "third" are merely intended to distinguish between similar objects rather than describe a specific order of objects. The "first", "second", and "third" are interchangeable in order in proper circumstances, so that aspects of this disclosure described herein can be implemented in an order other than the order illustrated or described herein.

Related data, such as user information and user feedbacks, is involved in aspects of this disclosure. When aspects of this disclosure are applied to a specific product or technology, user permission or consent may be required, and collection, use, and processing of related data may need to comply with related laws, regulations, and standards in related countries and regions.

Unless otherwise defined, meanings of all technical and scientific terms used in this specification are the same as those usually understood by a person skilled in the art to which this disclosure belongs. The terms used in this specification are merely intended to describe the objectives of aspects of this disclosure, but are not intended to limit this disclosure.

Before aspects of this disclosure are further described in detail, terms in aspects of this disclosure are described, and the following explanations are applicable to the terms in aspects of this disclosure.

(1) Virtual scene: a scene that is output or caused to be output by a device and that is different from the real world. Visual perception of the virtual scene can be formed through naked eyes or with assistance of the device. For example, a two-dimensional image may be output by a display screen, or a three-dimensional image may be output by using a three-dimensional display technology such as three-dimensional projection, virtual reality, or augmented reality. In addition, various types of perception obtained by simulating the real world, such as auditory perception, tactile perception, smell perception, and motion perception, may be further formed by using various possible types of hardware.

(2) In response to: configured for indicating a condition or a state on which an executed operation depends. When a condition or a state on which one or more executed operations depend is met, the one or more operations may be performed in real time or with a specified delay. An execution order of a plurality of executed operations is not limited, unless otherwise stated.

(3) Virtual object: an object that performs interaction in a virtual scene and that is controlled by a user or a robot program (for example, a robot program based on artificial intelligence), and may stay still, move, and perform various actions in the virtual scene, such as various characters in a game.

(4) Color histogram, short for color distribution histogram: a histogram for representing global distribution of colors in an image. Lengths of bars in the histogram represents proportions of different colors in an image. A color distribution histogram may be generated for each image, and a color vector of the image may be determined based on the color distribution histogram. A vector distance between color vectors may be configured for representing a color similarity between two images, and the vector distance is negatively correlated with the color similarity. For example, an image A is a photo of blue sky, and an image B is a photo of blue sea. The image A and the image B represent different content. If a vector distance between color vectors respectively corresponding to color histograms of the image A and the image B is small, a color similarity between the image A and the image B is high.

(5) Suit: dress of a virtual object in a game. The suit may include a variety of components. Component types may include shirts, trousers, shoes, ornaments (cloaks, hats, gloves, jewelry, and the like), pets, hanging pets (pets to be put on the virtual object), attack props, and the like. Any item or combination of items worn by the virtual object may be referred to as components of the suit. A suit may also or alternatively be referred to as a "skin."

One or more aspects of this disclosure provide a suit processing method for a virtual object, a suit processing apparatus for a virtual object, an electronic device, a computer-readable storage medium, and a computer program product, to implement a quick suit change for a virtual object in a virtual scene and improve a degree of concealment for the virtual object in the virtual scene.

An electronic device provided in one or more aspects of this disclosure may be implemented as various types of user terminals, for example, a notebook computer, a tablet computer, a desktop computer, a set-top box, or a mobile device (for example, a mobile phone, a portable music player, a personal digital assistant, a dedicated messaging device, a portable gaming device, or an in-vehicle terminal), or may be implemented as a server.

In an implementation scenario, FIG. 1A is a schematic diagram of an example of an application mode of a suit processing method for a virtual object. The method is applicable to application modes in which related data calculation of a virtual scene can be completed by completely relying on a computing capability of graphics processing hardware of a terminal device 400, for example, a game in a standalone or offline mode. The virtual scene may be output by various types of terminal devices 400 such as a smartphone, a tablet computer, and a virtual reality/augmented reality device.

In an example, types of the graphics processing hardware include a central processing unit (CPU) and a graphics processing unit (GPU).

During formation of visual perception of the virtual scene, the terminal device 400 may: calculate, by using the graphics computing hardware, data required for display; load, parse, and render (or cause to be rendered) display data; and output (or caused to be output), in graphics output hardware, a video frame forming the visual perception of the virtual scene. For example, a two-dimensional video frame may be displayed on a display screen of a smartphone, or a video frame for achieving three-dimensional display effect may be projected onto lenses of augmented reality/virtual reality glasses. In addition, to enrich perception effect, the terminal device 400 may further form one or more of auditory perception, tactile perception, motion perception, or taste perception with assistance of different hardware.

In an example, a client 401 (for example, a game application of a standalone version) is run on the terminal device 400. During running, the client 401 may output or cause to be output a virtual scene that includes role playing. The virtual scene may be an environment for interaction between game characters, for example, a plain, a street, or a valley for a battle between game characters. For example, the virtual scene may be displayed in a first-person view. A first virtual object and a launching prop (for example, a shooting prop or a throwing prop) held by the first virtual object by using a holding part (for example, a hand) may be displayed in the virtual scene. The first virtual object may be a game character controlled by a user. The first virtual object may be controlled by a real user, and may move in the virtual scene in response to an operation performed by the real user on a controller (for example, a touchscreen, a voice activated switch, a keyboard, a mouse, or a joystick). For example, when the real user moves the joystick to the right, the first virtual object moves to the right in the virtual scene. The first virtual object may further stay still, jump, or be controlled to perform a shooting operation or the like.

For example, the first virtual object may be a virtual object controlled by a user. The client 401 displays the virtual scene. The first virtual object in the virtual scene wears a first suit. The first suit may include a plurality of components. When the first virtual object moves to a first region from a second region, and in response to determining that a color of a first component in the first suit does not match a color of the first region, the first component may be replaced with a second component that matches the color of the first region. A wearing position or component type for the first component may be the same as that for the second component. For example, the first component may be a green backpack component, and the second component may be a white backpack component. Assuming that the first region is a snow region and the first virtual object moves from a second region, such as a grassland region, to the first region, a snow region, the green backpack may be replaced with the white backpack that matches a color of the first, snow region.

Figure 1B:
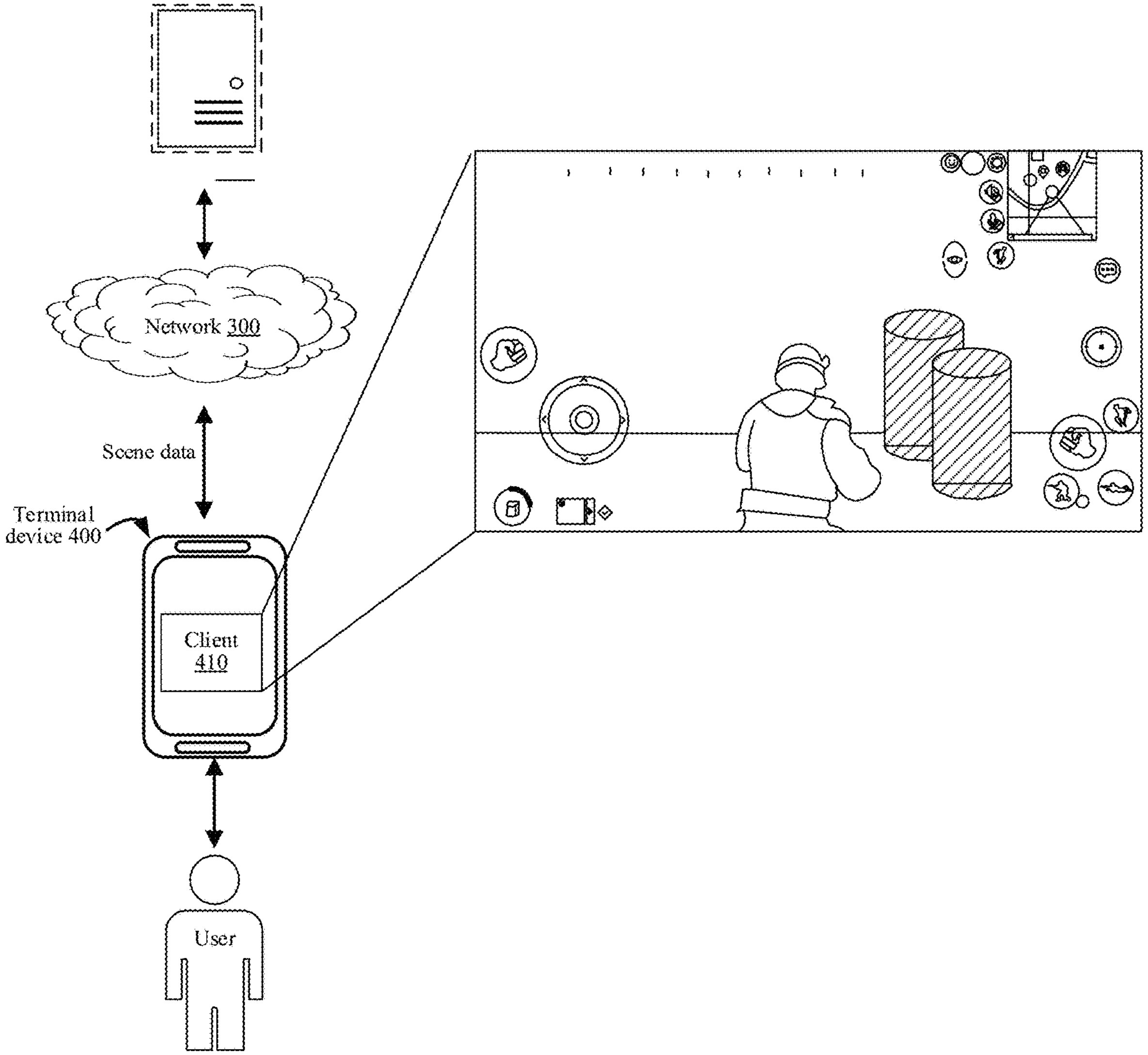
FIG. 1B is a schematic diagram of an example of an application mode of a suit processing method for a virtual object according to one or more aspects described herein.

In another implementation scenario, FIG. 1B is a schematic diagram of an example of an application mode of a suit processing method for a virtual object according to an aspect of this disclosure. The method is applied to a terminal device 400 and a server 200, and may be applicable to an application mode in which calculation of a virtual scene may be completed by relying on computing power of the server 200 and the virtual scene may be output on the terminal device 400.

Formation of visual perception of the virtual scene is used as an example. The server 200 may calculate display data (for example, scene data) related to the virtual scene, and transmit the display data to the terminal device 400 through a network 300. The terminal device 400 may load, parse, and render the display data by relying on graphics computing hardware, and output the virtual scene by relying on graphics output hardware to form the visual perception. For example, a two-dimensional video frame may be displayed on a display screen of a smartphone, or a video frame for achieving three-dimensional display effect may be projected onto lenses of augmented reality/virtual reality glasses. Perception in a form of a virtual scene may be output by corresponding hardware of the terminal device 400. For example, auditory perception may be formed by using a microphone, and tactile perception may be formed by using a vibrator.

In an example, a client 401 (for example, an online game application) may run on the terminal device 400, and may be connected to the server 200 (for example, a game server) to perform game interaction with another user, and the terminal device 400 may output a virtual scene 101 of the client 401. A first virtual object and a launching prop (for example, a shooting prop or a throwing prop) held by the first virtual object by using a holding part (for example, a hand) may be displayed in the virtual scene. The first virtual object may be a game character controlled by a user. The first virtual object may be controlled by a real user, and move in the virtual scene in response to an operation performed by the real user on a controller (for example, a touchscreen, a voice activated switch, a keyboard, a mouse, or a joystick). For example, when the real user moves the joystick to the right, the first virtual object moves to the right in the virtual scene. The first virtual object may further stay still, jump, or be controlled to perform a shooting operation or the like.

For example, the first virtual object may be a virtual object controlled by a user. The client 401 may display or cause to be displayed the virtual scene. The first virtual object in the virtual scene may wear a first suit. The first suit may include a plurality of components. When the first virtual object moves to a first region from a second region, in response to determining that a color of a first component in the first suit does not match a color of the first region, the first component may be replaced with a second component that matches the color of the first region. A wearing position or component type for the first component may be the same as that for the second component. For example, the first component may be a green backpack component, and the second component may be a white backpack component. Assuming that the first region is a snow region and the first virtual object moves from a second, grassland region to the snow region, the green backpack may be replaced with the white backpack that matches a color of the snow region.

In one or more aspects, the terminal device 400 may run a computer program to implement the suit processing method for a virtual object in one or more aspects of this disclosure. For example, the computer program may be a native program or a software module in an operating system. The computer program may be a native application (APP), to be specific, a program that needs to be installed in an operating system to run, for example, a shooting game APP (the client 401); or may be a mini program that only needs to be downloaded to a browser environment to run. To sum up, the computer program may be an application, a module, or a plug-in in any form.

For example, the computer program may be an application. During actual implementation, an application that supports a virtual scene may be installed and run on the terminal device 400. The application may be any one of a first-person shooting (FPS) game, a third-person shooting game, a virtual reality application, a three-dimensional map program, or a multiplayer survival game. A user may control movement of a virtual object in a virtual scene by using the terminal device 400. The movement may include but is not limited to at least one of body posture adjustment, crawling, walking, running, riding, jumping, driving, picking, shooting, attacking, throwing, and virtual building construction. For example, the virtual object may be a virtual character, such as a simulated character or an animation character.

One or more aspects of this disclosure may alternatively be implemented by using a cloud technology. The cloud technology is a hosting technology that integrates a series of resources such as hardware, software, and network resources in a wide area network or a local area network to implement data computing, storage, processing, and sharing.

The cloud technology is a general term for a network technology, an information technology, an integration technology, a management platform technology, an application technology, and/or the like that are based on application of a cloud computing business model, and may constitute a resource pool for use on demand and therefore is flexible and convenient. A background service of a technology network system requires a large number of computing and storage resources. Cloud gaming, also referred to as gaming on demand, is an online gaming technology based on a cloud computing technology. The cloud gaming technology enables a thin client with limited graphics processing and data operation capabilities to run a high-quality game. In a cloud gaming scenario, a game is not run on a game terminal of a player but is run on a cloud server. The cloud server renders a game scene into a video/audio stream, and the video/audio stream is transmitted to the game terminal of the player through a network. The game terminal of the player does not need to have strong graphics operation and data processing capabilities, but only needs to have a basic streaming media play capability and a capability of obtaining a player input instruction and transmitting the instruction to the cloud server.

For example, the server 200 in FIG. 1B may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal device 400 may be a smartphone, a tablet computer, a notebook computer, a desktop computer, a smart speaker, a smartwatch, or the like, but is not limited thereto. The terminal device 400 and the server 200 may be directly or indirectly connected through wired or wireless communication. This is not limited in one or more aspects of this disclosure.

Figure 2:
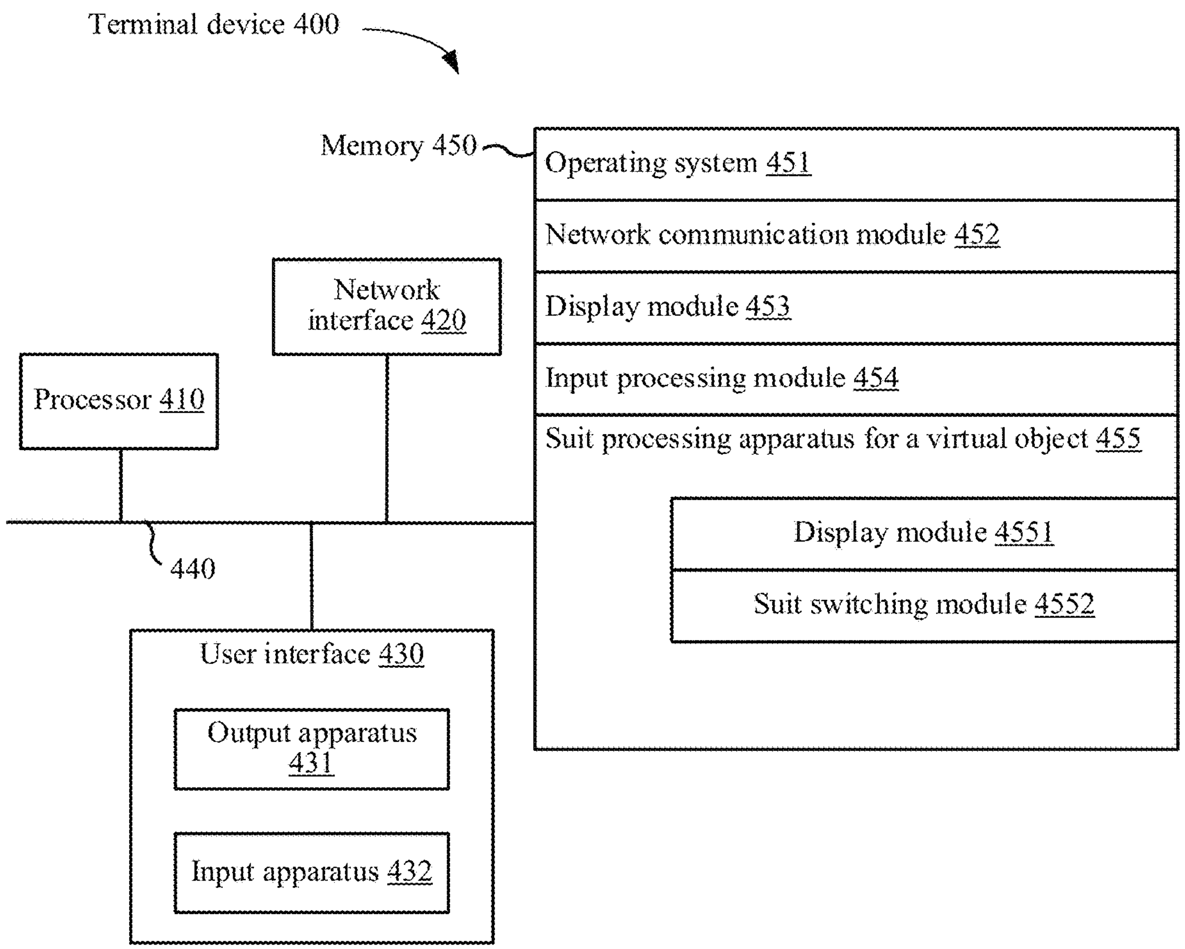
FIG. 2 is a schematic structural diagram of an example of a terminal device 400 according to one or more aspects described herein.

The following describes a structure of the terminal device 400 shown in FIG. 1A. FIG. 2 is a schematic structural diagram of an example of a terminal device 400 according to an aspect of this disclosure. The terminal device 400 shown in FIG. 2 may include at least one processor 410, a memory 450, at least one network interface 420, and a user interface 430. The components in the terminal device 400 may be coupled together through a bus system 440. The bus system 440 may be configured to implement connection and communication between the components. In addition to a data bus, the bus system 440 further includes a power bus, a control bus, and a state signal bus. However, for case of clear description, all types of buses in FIG. 2 are marked as the bus system 440.

The processor 410 may be an integrated circuit chip with a signal processing capability, for example, a general-purpose processor, a digital signal processor (DSP), another programmable logic device, a discrete gate or transistor logic device, or a discrete hardware component. The general-purpose processor may be a microprocessor, any conventional processor, or the like.

The user interface 430 may include one or more output apparatuses 431 capable of displaying media content, including one or more speakers and/or one or more visual display screens. The user interface 430 may further include one or more input apparatuses 432, including user interface components for facilitating user input, for example, a keyboard, a mouse, a microphone, a touch display screen, a camera, or another input button or control.

The memory 450 may be a removable memory, a non-removable memory, or a combination thereof. Exemplary hardware devices include a solid-state memory, a hard disk drive, an optical disc drive, and the like. The memory 450 may include one or more storage devices physically located away from the processor 410.

The memory 450 may store data to support various operations. Examples of the data include a program, a module, and a data structure or a subset or superset thereof, such as an operating system 451, including system programs for processing various basic system services and performing hardware-related tasks; a network communication module 452, configured to reach another computing device through one or more (wired or wireless) network interfaces 420, exemplary network interfaces 420 including Bluetooth, wireless fidelity (Wi-Fi), universal serial bus (USB), and the like; a display module 453, configured to display information by using one or more output apparatuses 431 (for example, a display screen or a speaker) associated with the user interface 430 (for example, a user interface for operating a peripheral device and displaying content and information); and an input processing module 454, configured to detect one or more user inputs or interactions from one or more input apparatuses 432 and translate the detected inputs or interactions.

In one or more aspects, the suit processing apparatus for a virtual object in one or more aspects of this disclosure may be implemented by using software. FIG. 2 shows a suit processing apparatus 455 for a virtual object that is stored in the memory 450. The suit processing apparatus 455 for a virtual object may be software in the form of a program or a plug-in, and may include the following software modules: a display module 4551 and a suit switching module 4552. These modules are logical modules, and therefore may be flexibly combined or further split based on an implemented function.

The following describes an interaction processing method for a virtual scene in one or more aspects of this disclosure with reference to accompanying drawings. The interaction processing method for a virtual scene in one or more aspects of this disclosure may be performed by the terminal device 400 in FIG. 1A alone, or may be jointly performed by the terminal device 400 and the server 200 in FIG. 1B.

Figure 3A:
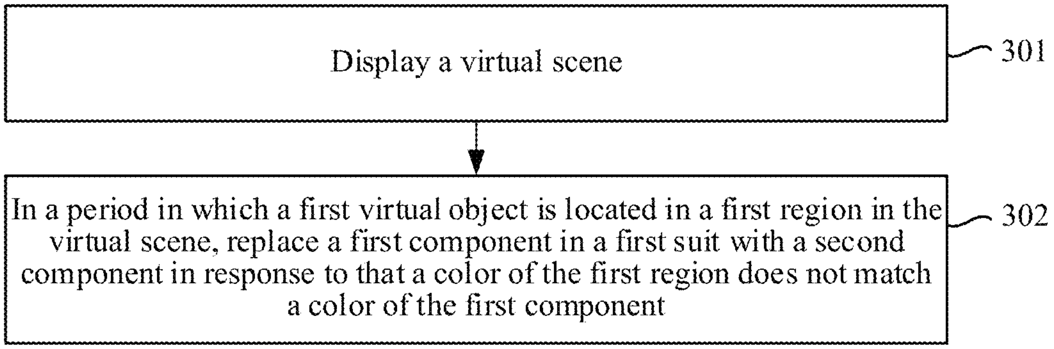
FIG. 3A to FIG. 3D are schematic flowcharts of an example of a suit processing method for a virtual object according to one or more aspects described herein.

An example in which the interaction processing method for a virtual scene in one or more aspects of this disclosure is jointly performed by the terminal device 400 and the server 200 in FIG. 1B is used below for description. FIG. 3A is a schematic flowchart of an example of an interaction processing method for a virtual scene according to an aspect of this disclosure. The method is described with reference to operations shown in FIG. 3A. The method shown in FIG. 3A may be performed by various forms of computer programs running on the terminal device 400. The computer program is not limited to the client 410, and may alternatively be an operating system, a software module, or a script in the foregoing descriptions. Therefore, the client is not to be construed as a limitation on one or more aspects of this disclosure.

Operation 301: Display a virtual scene.

Herein, the virtual scene may include a first virtual object wearing a first suit that may include a plurality of components that may be distributed at different positions on the first virtual object. The plurality of components may be of a same of different component type.

For example, component types may include shirts, trousers, shoes, ornaments (cloaks, hats, gloves, jewelry, and the like), pets, hanging pets (pets to be put on the virtual object), attack props, and the like. Any and all components that can be worn by the virtual object may be components of the suit. In one example, at least two components may constitute a suit. The first virtual object may be a user-controlled virtual object.

In one or more aspects, before operation 301, when the first virtual object enters a game battle in the virtual scene, the first virtual object may not wear any component. When the first virtual object does not wear any component, a component may be put on the first virtual object based on an environmental color of a first region, or a preset component (for example, a basic suit required for the game battle, or a preset suit specified by a player) may be put on the first virtual object.

Operation 302: In a period in which the first virtual object is located in a first region in the virtual scene (for example, when the first virtual object moves to the first region in the virtual scene from a second region in the virtual scene, wherein the first virtual object wears the first suit while in the second region), replace a first component in the first suit with a second component in response to determining that a color of the first region does not match a color of the first component.

Herein, the second component may be selected based on a determination that a color of the second component matches the color of the first region, and a wearing position for the second component is the same as that for the first component.

For example, a color of at least one first component in the first suit may not match the color of the first region, and operation 302 is performed for each first component, so that a color of each component in a switched-to suit matches the color of the first region.

In one or more aspects, whether the color of the first component matches the color of the first region may be determined based on a color similarity. That the color of the first region does not match the color of the first component means that a color similarity (a value range of the color similarity is [0, 1]) between a color of a component and a color of a current location of a virtual object (for example, a color of a nearby environment) is less than a color similarity threshold (for example, the color similarity threshold is 0.5).

For example, the color similarity is calculated in the following manner: Grayscale values of red, green, and blue channels of the first component and grayscale values of red, green, and blue channels of the first region are respectively mapped to points in a normalized hue-saturation-value (HSV) color space, and a distance between two points is calculated. A higher similarity between the color of the first component and the color of the first region indicates that a vector distance between the two points is closer to 0. On the contrary, a lower similarity between the two colors indicates that the vector distance is closer to 1. Therefore, a difference between 1 and the distance may be the color similarity.

For example, the first region may be any region in the virtual scene. Regions in the virtual scene may be divided in any one of the following manners: 1. The virtual scene is divided based on different terrains. For example, the virtual scene is divided into a mountain region, a plain region, a basin region, a forest region, and a lake region based on terrains. 2. The virtual scene is divided based on areas. For example, the virtual scene is divided into a plurality of rectangles, squares, and circles with equal areas based on grids in a map of the virtual scene. 3. The virtual scene is divided based on different functions. For example, the virtual scene is divided into a warehouse region, a residential region, a wild region, and an agricultural region based on functions.

Figure 5A:
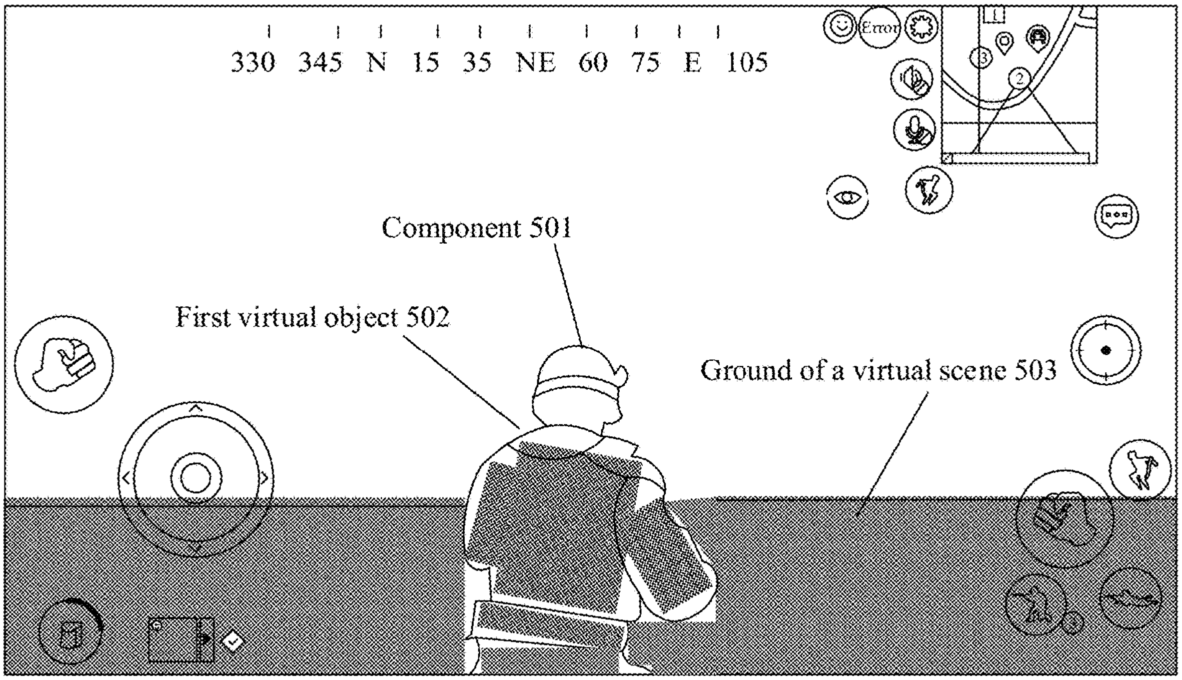
FIG. 5A to FIG. 5C are schematic diagrams of examples of virtual scene interfaces according to one or more aspects described herein.
Figure 5B:
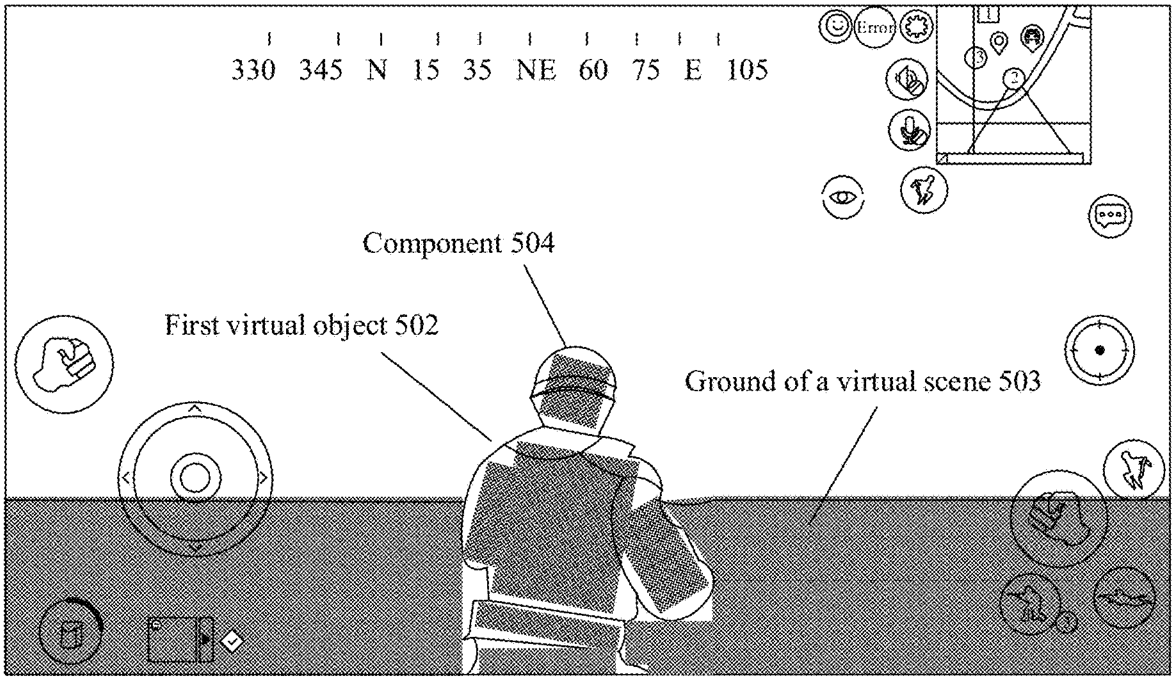

FIG. 5A is a schematic diagram of a virtual scene interface according to an aspect of this disclosure. A first virtual object 502 is in the virtual scene. An environmental color of the virtual scene is determined based on a color of ground 503, in the virtual scene, on which the first virtual object 502 stands. A component 501 is a component on a head (wearing position) of the virtual object, for example, a helmet. The component 501 does not match the environmental color of the virtual scene. FIG. 5B is a schematic diagram of a virtual scene interface according to an aspect of this disclosure. The component 501 is replaced with a component 504 that matches the color of the virtual scene.

In one or more aspects of this disclosure, a component in a suit of a virtual object is automatically replaced with a component that matches a color of a virtual scene, so that an automatic suit change for the virtual object is implemented during a battle. This improves concealment of the virtual object in the virtual scene, and improves game experience of a user. The replacement may similarly be automatically performed for multiple components of the suit of the virtual object.

In one or more aspects, the virtual scene further includes an automatic suit change control; and the replacing a first component in the first suit with a second component in response to determining that a color of the first region does not match a color of the first component may be implemented in the following manner: displaying the automatic suit change control in an on state in response to an enabling operation for the automatic suit change control; and automatically replacing at least one first component in the first suit with the second component in response to determining that the color of first region does not match a color of the first component.

For example, when the automatic suit change control is in an on state, component switching is automatically performed to switch the first component that does not match the color of the first region to the second component; or when the automatic suit change control is in an off state, no component switching is performed. The enabling operation may be an operation of tapping or touching-and-holding the automatic suit change control by a user, or the like. When the user taps or touches-and-holds the automatic suit change control in the on state, the automatic suit change control switches to the off state.

Figure 5C:
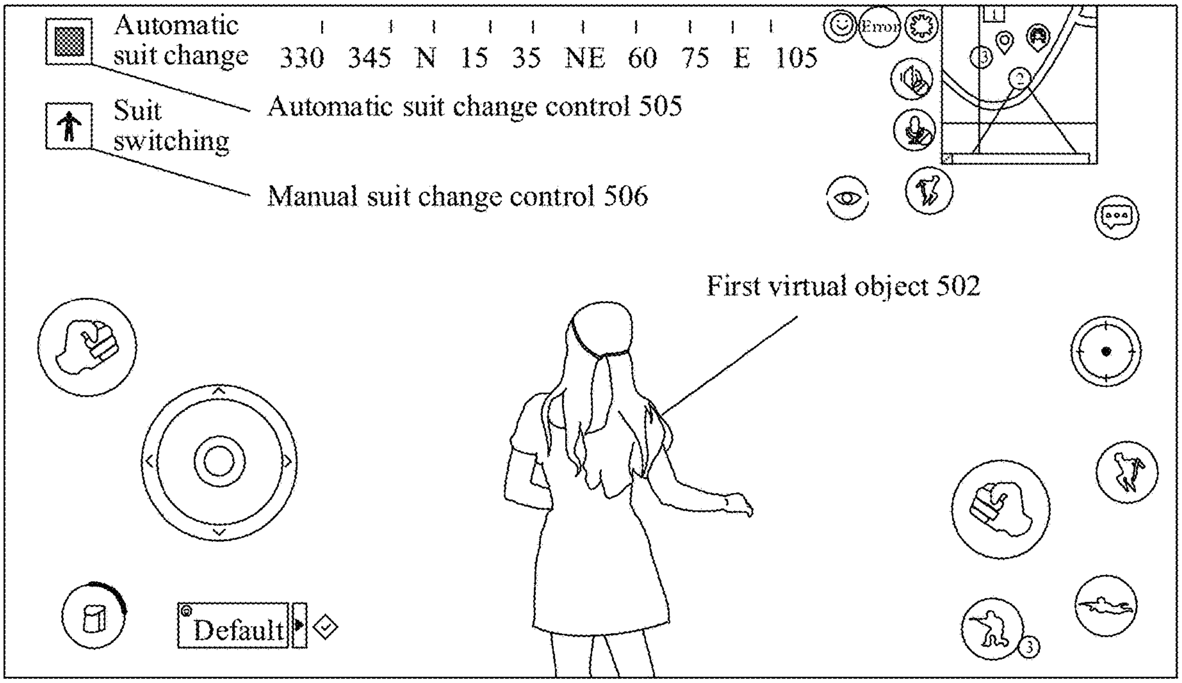
Figure 5D:
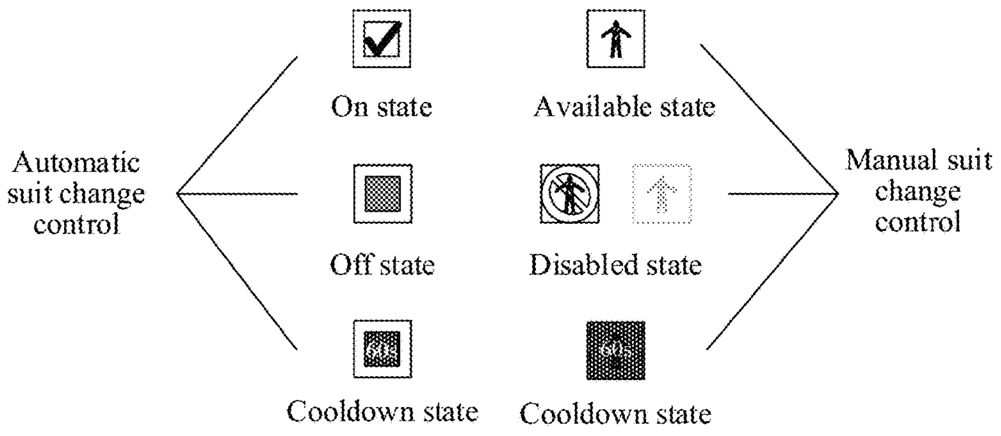
FIG. 5D is a schematic diagram of an example of control states according to one or more aspects described herein.

FIG. 5C is a schematic diagram of an example of a virtual scene interface according to an aspect of this disclosure. An automatic suit change control 505 is displayed in the virtual scene as a floating layer. FIG. 5D is a schematic diagram of examples of control states according to an aspect of this disclosure. When an automatic suit change control is in an on state, an automatic suit change function is performed. After at least automatic component switching is performed in a suit, if a current quantity of suit changes reaches a maximum quantity (for example, 10) of suit changes, the automatic suit change control switches from the on state to an off state, no automatic suit change function is performed, and when a trigger operation for enabling the automatic suit change control is received, no response is performed to the trigger operation. After automatic component switching is performed in the suit, if a current quantity of suit changes does not reach the maximum quantity of suit changes, the automatic suit change control enters a cooldown state. In the cooldown state, no automatic suit change function is performed, and a countdown corresponding to preset cooldown duration is displayed on the automatic suit change control, until the countdown of the preset cooldown duration (for example, 60 seconds) ends. When the preset cooldown duration elapses, the automatic suit change control is restored to the on state.

In one or more aspects, the virtual scene further includes a manual suit change control. Referring back to FIG. 5C, an example of an automatic suit change control 505 is displayed in the virtual scene as a floating layer. When an automatic suit change mode is in an on state, a user may switch the first component in the suit to another component by using the manual suit change control. The foregoing switching may be implemented in the following manner: in response to a trigger operation for the manual suit change control, replacing the first component in the first suit with a third component, and retaining a switched-to first suit within a wearing duration threshold, the third component being any component whose wearing position is the same as that for the first component; and in response to that duration in which the switched-to first suit is retained reaching the wearing duration threshold and determining that the color of the first region does not match a color of the third component in the first suit, replacing the third component with a fourth component, wherein the fourth component is selected on a basis of a color of the fourth component matching the color of the first region, and a wearing position for the fourth component being the same as that for the third component.

The third component may be a component associated with the manual suit change control, or a component actively selected by a user. For example, in the automatic suit change mode, the user wants to try on a newly obtained hat B (the third component), and in response to a trigger operation for the manual suit change control, a hat A (the first component) currently worn by the first virtual object is replaced with the hat B (the third component). Within a wearing duration threshold, the first virtual object keeps wearing the hat B. When the wearing duration threshold elapses, if a color of the hat B does not match the environmental color of the virtual scene, the hat B is replaced with a hat D (the fourth component) that does match the environmental color.

In one or more aspects, before the response to a trigger operation for the manual suit change control, the first component is determined in any one of the following manners: In a first scenario, in response to a selection operation for any component in the first suit, the selected component is used as the first component. In a second scenario, a component with a largest color difference from other components in the first suit is used as the first component. For example, a color similarity between every two components in the first suit is calculated. For each component, a sum of color similarities between the component and other components is obtained. A component with a smallest sum of similarities is used as a component with a largest color difference from other components. In a third scenario, a component with a smallest performance parameter in the first suit is used as the first component. The performance parameter may include at least one of the following: a defense performance parameter, an attack performance parameter, a virtual object level required for wearing the component, or a movement speed performance parameter.

In one or more aspects, the virtual scene may further include a manual suit change control; and the replacing a first component in the first suit with a second component in response to determining that a color of the first region does not match a color of the first component may be implemented in the following manner: displaying (or causing to be displayed) the manual suit change control in an available state in response to determining that a manual suit change condition is met; and replacing at least one first component in the first suit with the second component in response to determining that the color of first region does not match a color of the first component and receiving a trigger operation for the manual suit change control.

Herein, the manual suit change condition may include at least one of the following: a time interval between a current moment and a suit change moment of a previous suit change is greater than or equal to an interval threshold (for example, 60 seconds); or a quantity of suit changes of the first virtual object in a current battle does not reach a maximum quantity (for example, 10) of suit changes.

In one or more aspects, in response to determining that the manual suit change condition is not met, the manual suit change control is displayed in a disabled state in any one of the following manners: the manual suit change control is hidden; the manual suit change control is displayed in gray; or a disabled sign is displayed on the manual suit change control.

Referring again to FIG. 5D, if a manual suit change condition is met, a manual suit change control is in an available state, and at least one or more components in a suit of a virtual object are switched in response to a trigger operation for the manual suit change control. If a current quantity of suit changes reaches the maximum quantity of suit changes, the manual suit change control is displayed in a disabled state (as shown in FIG. 5D, the disabled state may be represented by a grayscale state or by displaying a disabled sign on the manual suit change control). After at least automatic component switching is performed in the suit, if a current quantity of suit changes does not reach the maximum quantity of suit changes, the manual suit change control enters a cooldown state (a disabled state that can be restored to the available state). In the cooldown state, the manual suit change control cannot be triggered, and a countdown corresponding to preset cooldown duration is displayed on the manual suit change control, until the preset cooldown duration (for example, 60 seconds) ends. When the preset cooldown duration elapses, the manual suit change control is restored to the available state.

In one or more aspects, if a current quantity of suit changes reaches the maximum quantity of suit changes, the automatic suit change control and/or the manual suit change control may alternatively be hidden to indicate that the automatic suit change control and/or the manual suit change control is disabled.

In one or more aspects, before the first component is replaced with the second component, the second component is selected in the following manner: obtaining a plurality of candidate components configured for a same wearing position as the first component; and selecting a candidate component meeting a screening condition among the plurality of candidate components as the second component, the plurality of candidate components being owned by the first virtual object.

The screening condition may include any one of the following:

1. A function of the candidate component is the same as that of the first component, and the function of the candidate component is stronger than that of the first component. For example, the function of the candidate component includes at least one of the following: attack, defense, or a movement speed.

Figure 6A:
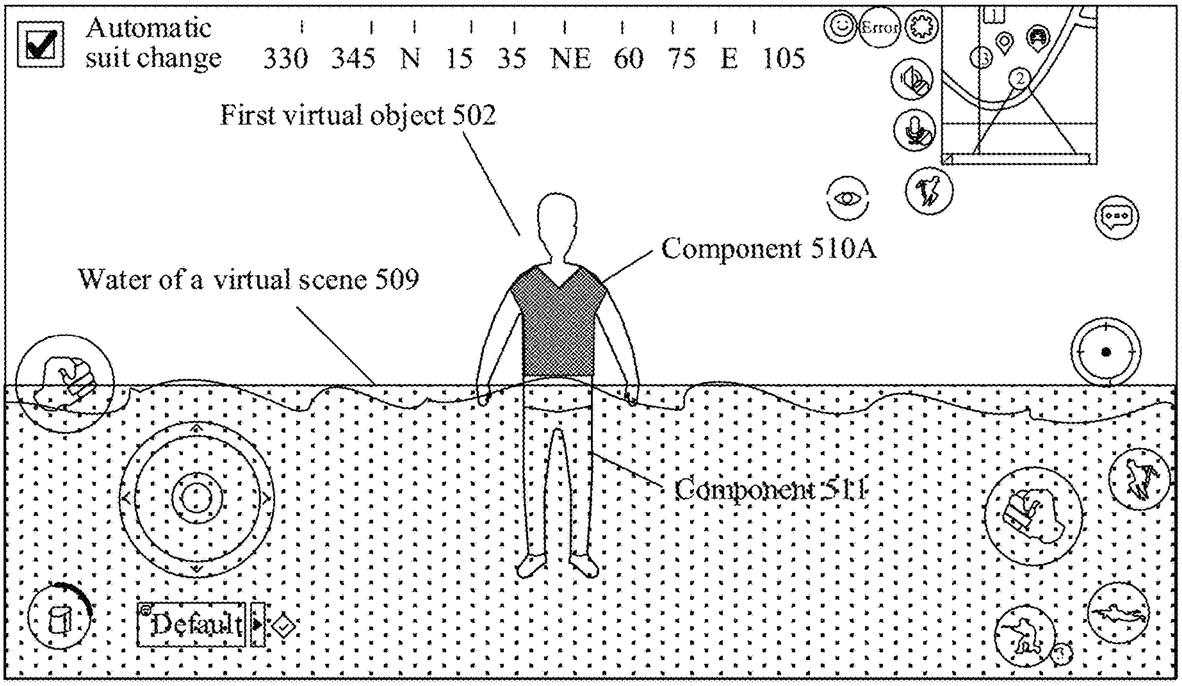
FIG. 6A to FIG. 6F are schematic diagrams of examples of virtual scene interfaces according to one or more aspects described herein.
Figure 6B:
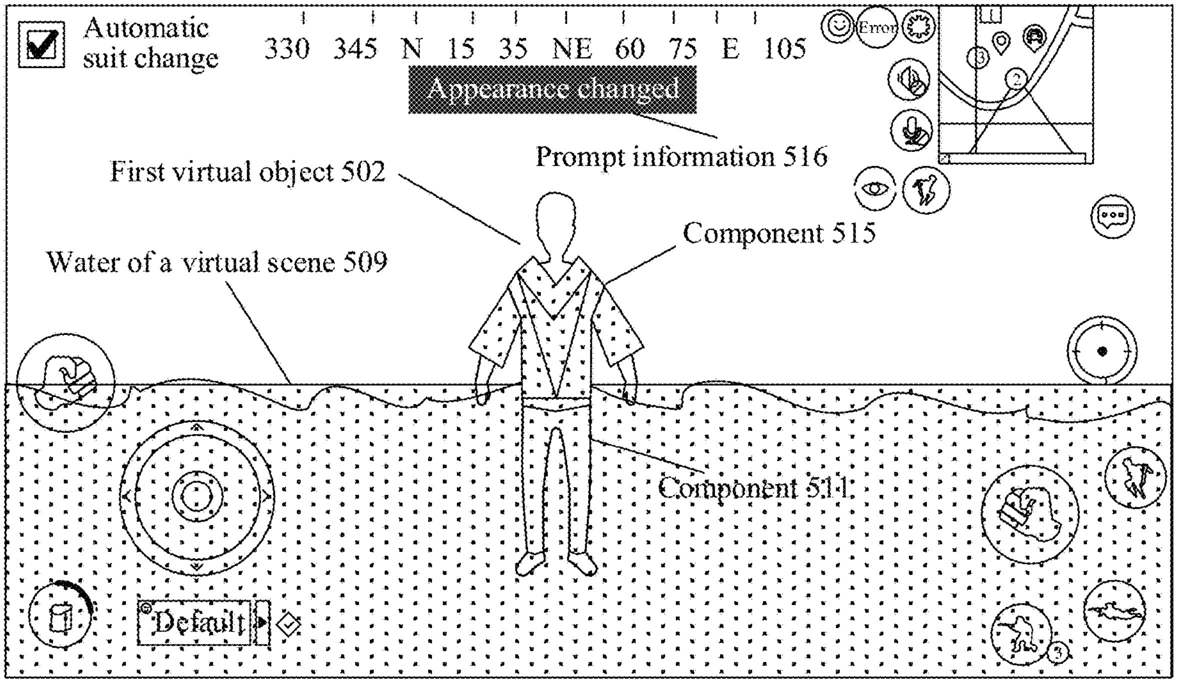

2. A wearing position for the first component is not obscured by a virtual environment. For example, FIG. 6A is a schematic diagram of a virtual scene interface according to an aspect of this disclosure. A first virtual object 502 is wearing a component 511 and a component 510A. Legs of the first virtual object are under a water surface 509 in the virtual scene. In this case, the component 511 is obscured by water in the virtual scene. Above the water surface, it is difficult to identify a color of an underwater environment. Only the component 510A of the first virtual object 502 that is not obscured may be replaced. FIG. 6B is a schematic diagram of a virtual scene interface according to an aspect of this disclosure. The component 510A is replaced with a component 515 that matches a color of the virtual scene, and the component 511 obscured by the water is not replaced.

3. A color similarity between the candidate component and the first region is greater than a color similarity threshold. For example, if the color similarity between the candidate component and the first region is greater than the color similarity threshold, a color of the candidate component matches the color of the first region. The second component may be a candidate component with a highest color similarity to the first region among candidate components that meet the screening condition.

Figure 3B:
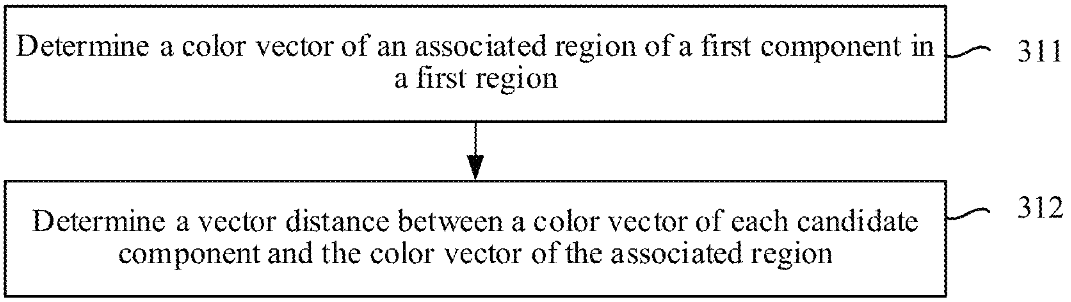

In one or more aspects, before the first component is replaced with the second component, the operations shown in FIG. 3B may be performed. FIG. 3B is a schematic flowchart of a suit processing method for a virtual object according to an aspect of this disclosure. The color similarity is determined in operation 311 and operation 312. Details are described below.

Operation 311: Determine a color vector of an associated region of the first component in the first region.

The associated region may be a region corresponding to a virtual environment closest to the first component, and may be a geometric region formed with the first virtual object as a center. For example, if a virtual environment closest to feet of the first virtual object is the ground, a circle may be formed on the ground in the virtual scene with the feet of the first virtual object as a center and a preset length as a radius, and the circle may be the associated region; or a square may be formed on the ground in the virtual scene with a preset length as a side length, and the square may be the associated region. An area of the associated region is determined based on an area occupied by the first virtual object in the virtual scene. For example, a circular region whose area is preset times (for example, 10 times) of an area occupied by the virtual object on the ground is the associated region (positively correlated with a size of a part of the first virtual object).

For example, the color vector may be configured for representing a color distribution feature of a component or an environment of the virtual scene. The color distribution feature may be types of colors included in the environment and a proportion of each color.

Figure 3C:
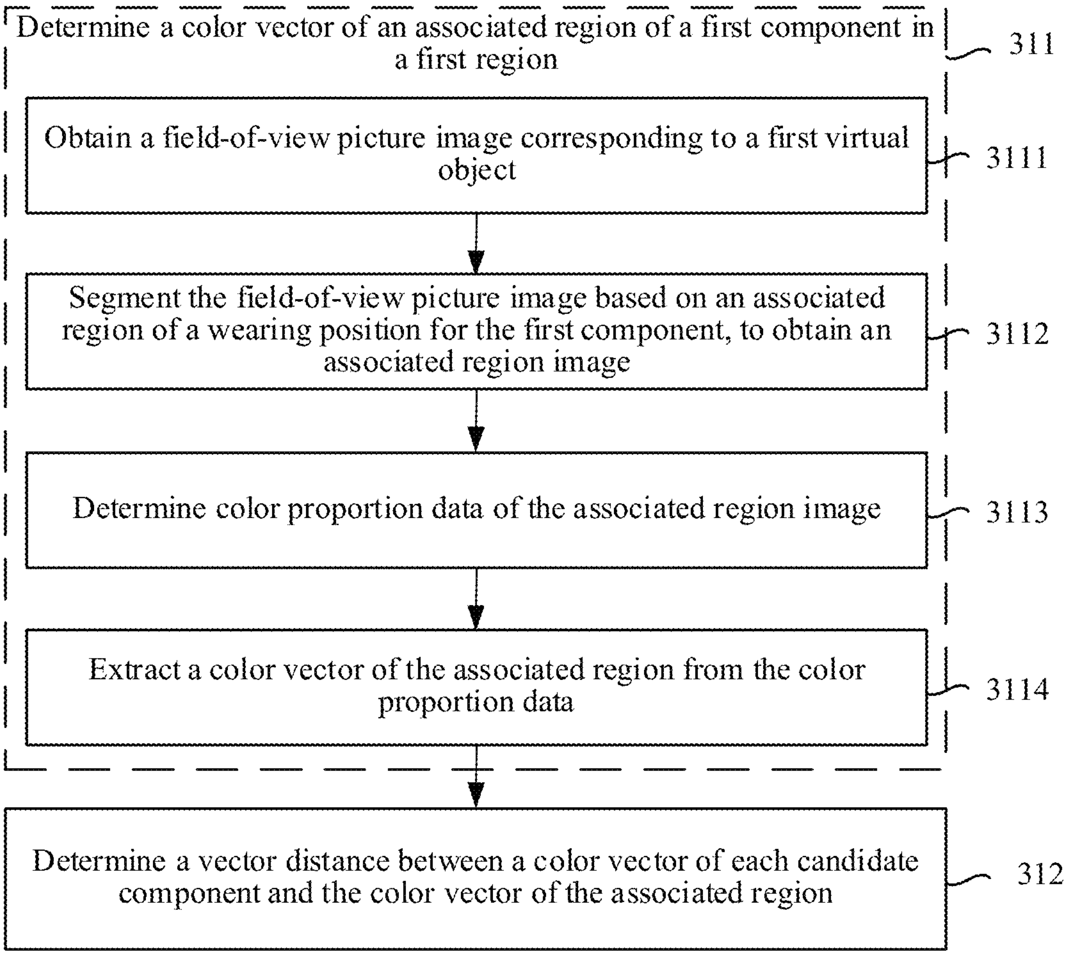

FIG. 3C is a schematic flowchart of a suit processing method for a virtual object according to an aspect of this disclosure. Operation 311 of FIG. 3B may be implemented by operation 3111 and operation 3114 of FIG. 3C. Details are described below.

Operation 3111: Obtain a field-of-view picture image corresponding to the first virtual object.

To reduce performance consumption, when the virtual object is in a game battle, a frame of a game picture in a field of view of the virtual object may be captured at an interval of preset duration (for example, 10 seconds) to obtain the field-of-view picture image. The field-of-view picture image may not include controls displayed in the form of floating layers, small maps, or other parts in the virtual scene. This avoids introducing additional interference factors into the field-of-view picture, and therefore improves accuracy of obtaining the color vector.

Operation 3112: Segment the field-of-view picture image based on an associated region of the wearing position for the first component, to obtain an associated region image.

For example, the virtual scene may be a 3D scene. In this case, a plane on which the associated region is located may not necessarily be parallel to a plane on which the field-of-view picture image is located. Based on a planar region, in the field-of-view picture image, to which the associated region is mapped, the field-of-view picture image may be segmented to obtain the associated region image.

To improve accuracy of determining the associated region image, a mapping material image of a virtual scene closest to the first virtual object may alternatively be used as the associated region image. For example, at least some of mapping material images of ground at a location at which the first virtual object stands may be captured based on the associated region as the associated region image.

Figure 5E:
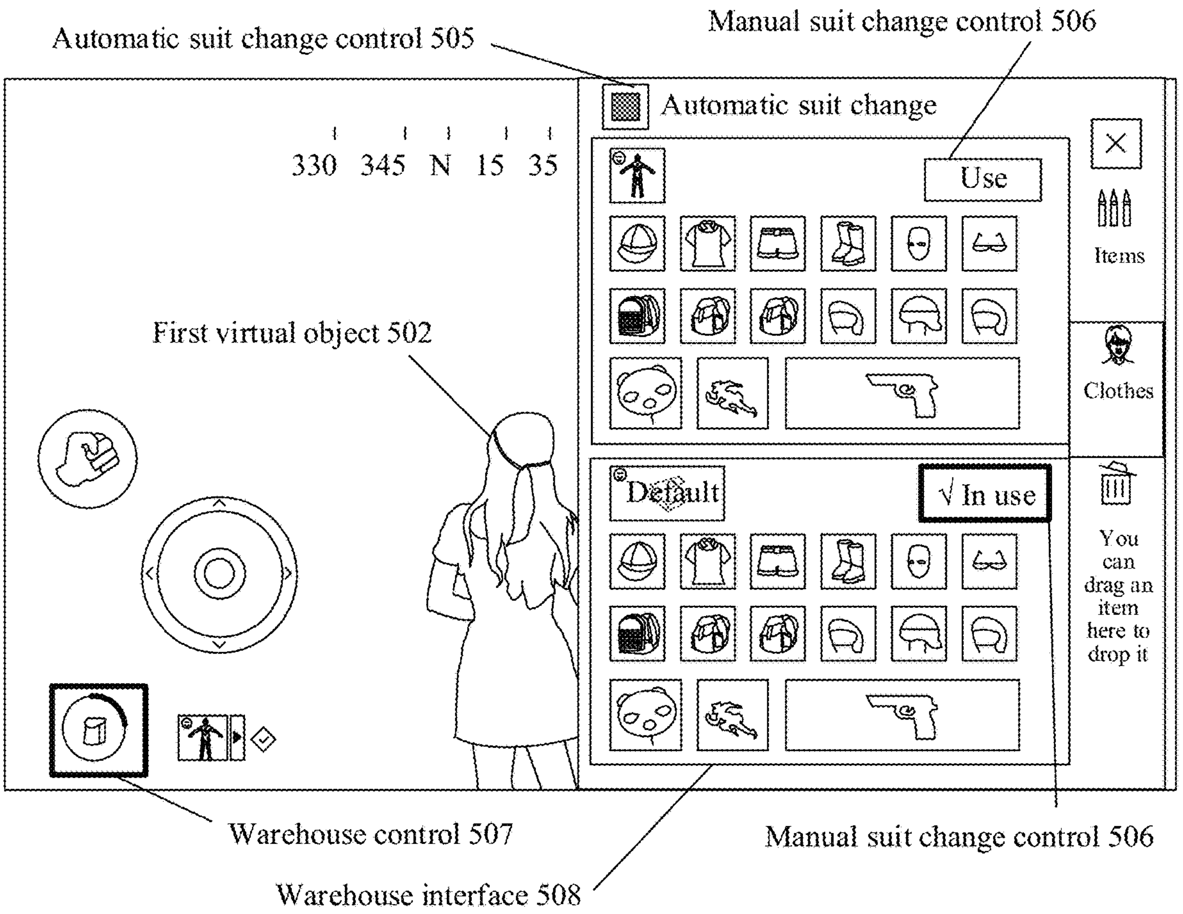
FIG. 5E is a schematic diagram of an example of a warehouse interface according to one or more aspects described herein.
Figure 5F:
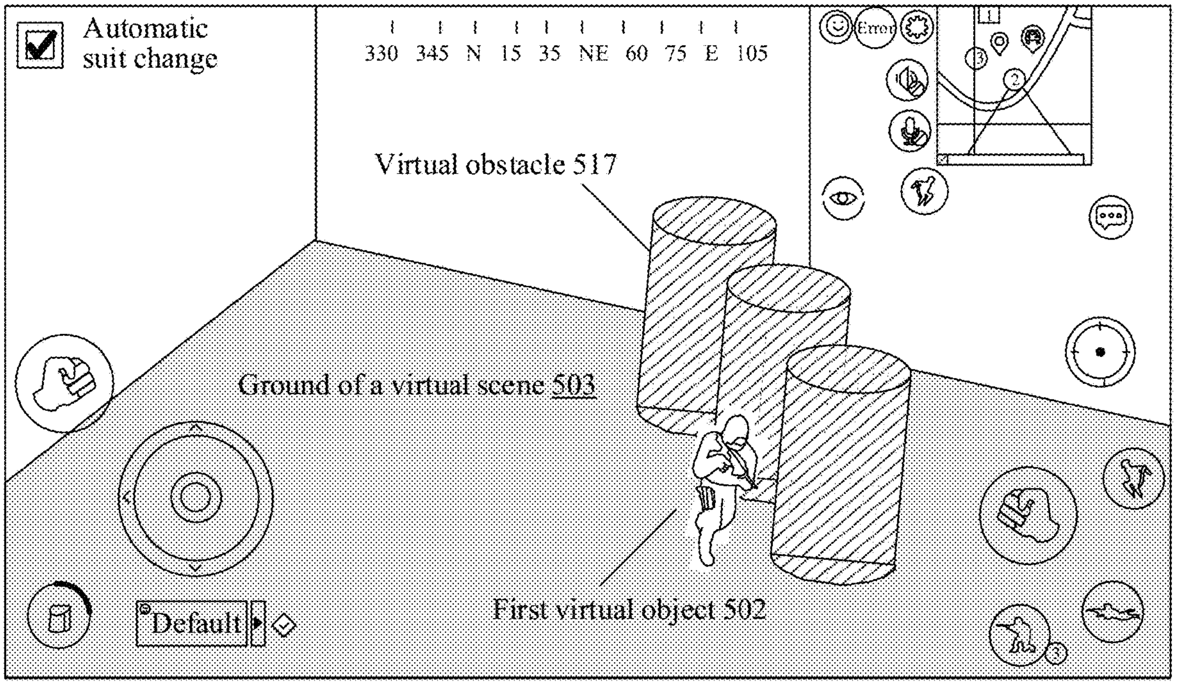
FIG. 5F and FIG. 5G are schematic diagrams of examples of virtual scene interfaces according to one or more aspects described herein.
Figure 5G:
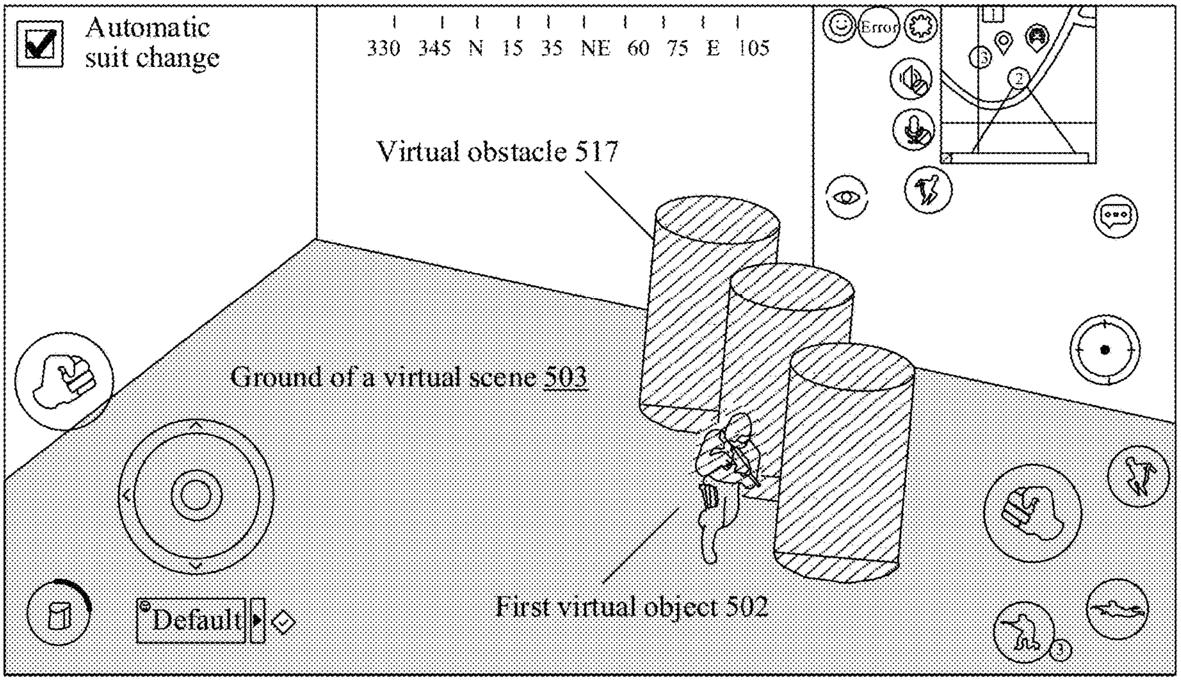

FIG. 5F is a schematic diagram of a virtual scene interface according to an aspect of this disclosure. A component on an upper body of a virtual object 502 is closest to a virtual obstacle 517 in the virtual scene, and a component on a leg of the virtual object 502 is closest to ground 503 in the virtual scene. In this case, an associated region of the component on the upper body of the first virtual object 502 may be located in the virtual obstacle 517, and an associated region of the component on the leg of the first virtual object 502 may be located on the ground 503 in the virtual scene. FIG. 5G is a schematic diagram of a virtual scene interface according to an aspect of this disclosure. An associated region image of the component on the upper body of the first virtual object 502 may include a part of the virtual obstacle 517, and therefore the component on the upper body may be switched to a component that matches a color of the virtual obstacle 517. Similarly, an associated region image of the component on the leg of the first virtual object 502 may include a part of the ground 503 in the virtual scene, and therefore the component on the leg may be switched to a component that matches a color of the ground 503 in the virtual scene.

Operation 3113: Determine color proportion data of the associated region image.

The color proportion data may be displayed in the form of data, a table, or a histogram. The color proportion data may include a proportion of each color of the associated region image in all colors of the associated region image. Operation 3113 may be implemented in the following manner: A size of the associated region image may be reduced to scale the associated region image to a preset size (for example, 8 pixels×8 pixels, namely, 64 pixels in total; or 16 pixels×16 pixels, namely, 256 pixels in total), and a size-reduced image may be converted into a grayscale image. A proportion of each color in the grayscale image may be counted to obtain the color proportion data of the associated region image. For example, for an 8 pixels×8 pixels size-reduced image, the size-reduced associated region image may be down-sampled based on a preset 64-level grayscale to obtain a grayscale image. A maximum quantity of types of colors in the grayscale image is 64. A total quantity of pixels in the grayscale image may be obtained. A quantity of pixels corresponding to each color in the grayscale image may be counted. A ratio of the quantity of pixels corresponding to each color to the total quantity of pixels may be a proportion value corresponding to each color.

Figure 8:
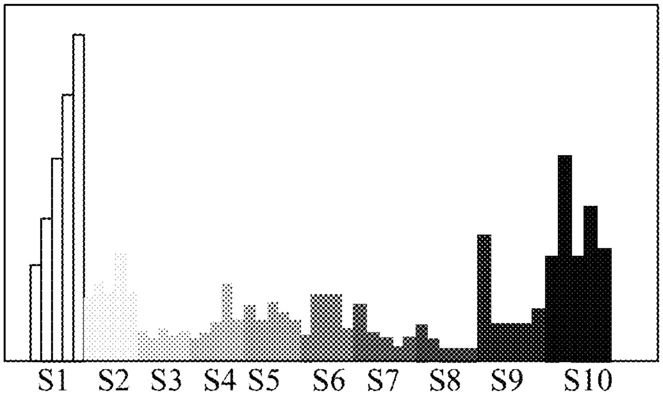
FIG. 8 is a schematic diagram of an example of a color histogram according to one or more aspects described herein.

In one or more aspects, a color histogram may be obtained by creating a histogram based on the color proportion data. FIG. 8 is a schematic diagram of a color histogram according to an aspect of this disclosure. Lengths of bars in the color histogram may represent proportions of different types of colors in the associated region image. S1, S2, S3, S4, S5, S6, S7, S8, S9, and S10 correspond to different color systems. Each color system may include a plurality of types of colors, and each color system may correspond to a same quantity of types of colors.

Operation 3114: Extract a color vector of the associated region from the color proportion data.

The color proportion data may be converted into a color vector with low complexity by using a neural network model. For example, a color proportion vector of the color proportion data may be determined based on the proportion value corresponding to each color in the color proportion data. To be specific, proportion values corresponding to all colors may be combined into a vector to obtain the color proportion vector. A total quantity of dimensions of the color proportion vector may be the same as a quantity of types of colors in the color proportion data. The color proportion vector may be mapped to the color vector of the associated region in a dimensionality reduction manner.

For example, the mapping in the dimensionality reduction manner may be implemented in the following manner: A first total quantity of dimensions preconfigured for the color vector for dimensionality reduction may be obtained, the first total quantity of dimensions being smaller than a second total quantity of dimensions corresponding to the color proportion vector. All colors in the color proportion vector may be divided into color intervals whose quantity is equal to the first total quantity of dimensions. Weighted summation may be performed on each proportion value in each color interval. A weighted summation result corresponding to each color interval may be normalized. All normalization results may be combined into a dimensionality-reduced color vector, namely, the color vector of the associated region.

For example, it is assumed that the color proportion data of the associated region image is denoted as a color dataset X. X={x1, x2, . . . , xn}. xi is a color proportion (proportion value) corresponding to an $i^{th}$ color in the color dataset, and a value range of the color proportion is (1≥xi≥0). Colors in the color dataset are sorted based on color systems of the colors. For example, the color dataset includes seven colors that are sequentially sorted as follows: red, orange, yellow, green, cyan, blue, and violet. In one or more aspects of this disclosure, 64 colors are used as an example for description. All proportion values in the color dataset X={x1, x2, . . . , x64} may be combined into a color proportion vector (x1, x2, . . . , x64). The color proportion vector corresponds to 64 dimensions, and the color proportion vector may be mapped to a color vector in a dimensionality reduction manner.

Assuming that the color vector obtained through mapping in the dimensionality reduction manner has six dimensions, the 64-dimensional color proportion vector may be mapped in the dimensionality reduction manner in the following way: All colors in the 64-dimensional color proportion vector may be divided into six color intervals. A weighted summation result for a proportion value of each color in the six color intervals may be obtained. Obtained six weighted summation results may be normalized to obtain six normalization results: c, d, e, f, g, and h. A dimensionality-reduced color vector may be denoted as A. In this case, A=(c, d, e, f, g, h).

Figure 3D:
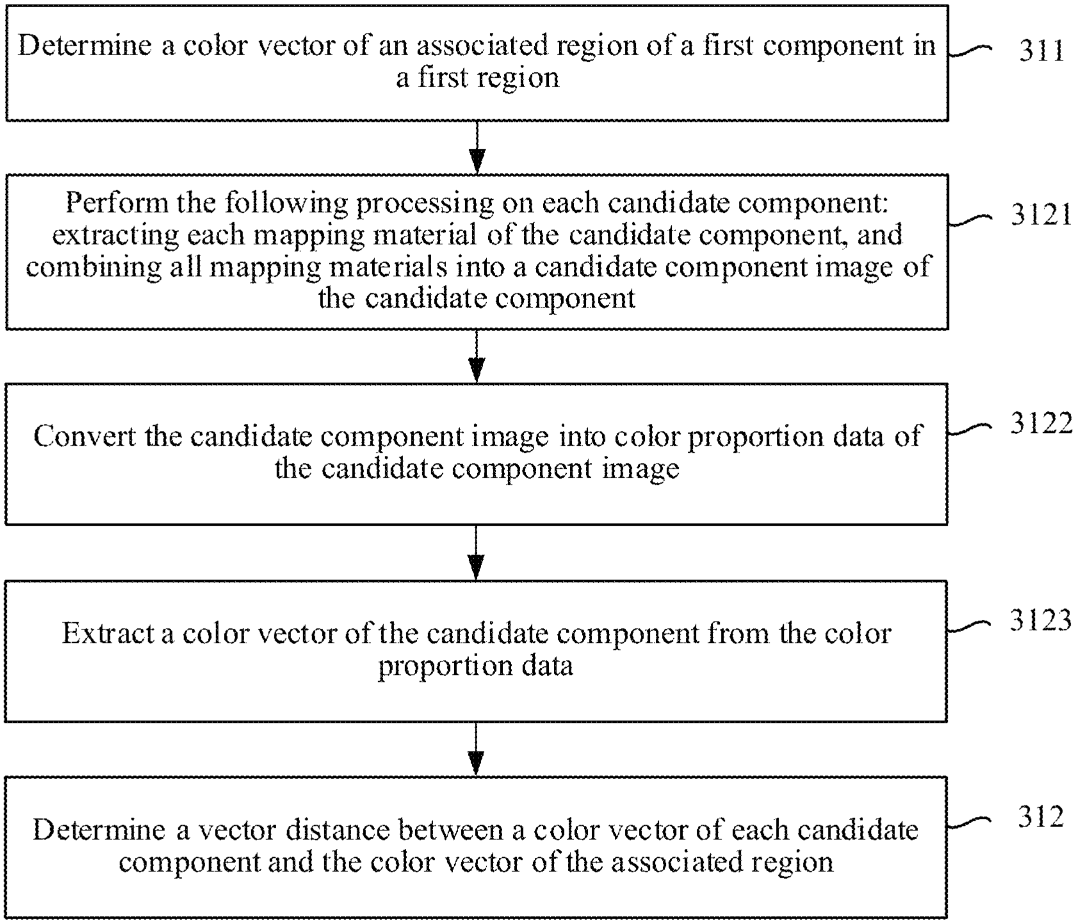

FIG. 3D is a schematic flowchart of a suit processing method for a virtual object according to an aspect of this disclosure. Before operation 312, a color vector of each candidate component is determined in operation 3121 to operation 3123. Details are described below.

Operation 3121: Perform the following processing on each candidate component: extracting each mapping material of the candidate component, and combining all mapping materials into a candidate component image of the candidate component.

For example, when the virtual scene is a two-dimensional virtual scene and a component is also a two-dimensional component, three views or front and rear views of the component may be tiled to form a component image; or when a component is a three-dimensional component, mapping materials of all outer surfaces of the component may be obtained and tiled to form a component image. A color vector of each component owned by a virtual object may be obtained in advance, and the color vector may be stored in a database. Dimensionality of the color vector is positively correlated with precision required for color recognition.

Operation 3122: Convert the candidate component image into color proportion data of the candidate component image.

Operation 3122 may be implemented in the following manner: reducing a size of the candidate component image; converting a size-reduced image into a grayscale image; and obtaining, from the grayscale image through statistics collection, color proportion data of each color in the candidate component image.

For example, operation 3122 is conversion performed on the candidate component image, and operation 3113 is conversion processing performed on the associated region image. Principles of the conversion in the two operations are the same. For execution of operation 3122, refer to operation 3113. Details are not described herein again.

Operation 3123: Extract a color vector of the candidate component from the color proportion data.

Operation 3123 may be implemented in the following manner: determining a color proportion vector of the color proportion data based on a proportion value corresponding to each color in the color proportion data, a value of each dimension of the color proportion vector corresponding to each proportion value in a one-to-one manner; and mapping, in a dimensionality reduction manner, the color proportion vector to the color vector of the candidate component.

For example, for execution of operation 3123, refer to operation 3114. Details are not described herein again.

Referring back to FIG. 3B, the following operation may be performed: Operation 312: Determine a vector distance between a color vector of each candidate component and the color vector of the associated region.

Herein, the vector distance is configured for representing a color similarity between the candidate component and the first region, and the vector distance is negatively correlated with the color similarity.

For example, it is assumed that a color vector corresponding to an $i^{th}$ candidate component at the wearing position for the first component is Bi, and Bi is represented as follows: B=(Ci, Di, Ei, Fi, Gi, Hi). A vector distance x between a color vector A and the color vector Bi is expressed as the following formula (1):

$$x=\sqrt{(c-Ci)^2+(d-Di)^2+(e-Ei)^2+\ldots+(h-Hi)^2} \quad (1)$$

A difference between 1 and x may be a color similarity. To be specific, when x is the smallest (the color similarity is the highest), a candidate component corresponding to the color vector Bi may be a component, at the wearing position, that best matches an environmental color. The candidate component may be used as the second component, and the first component may be replaced with the second component.

A local environment of a virtual scene may be compared with a color of a component of a virtual object. This improves accuracy of determining a color similarity, improves accuracy of a suit change for a virtual character, improves a degree of concealment for the virtual object in the virtual scene, avoids excessively high memory usage of a client running the virtual scene due to an incorrect suit change, saves resources of a terminal device, and improves battery life of the terminal device running the virtual scene.

Frequent replacement of components in a suit of a virtual object may be avoided in the following manner: replacing the first component with the second component in response to determining that a replacement limiting condition is met, the replacement limiting condition including at least one of the following:

1. A quantity of suit changes of the first virtual object in a current battle does not reach a maximum quantity (for example, 10) of suit changes.

2. The first virtual object needs to be concealed. The concealment requirement of the virtual object may be identified in the following manner: calling, based on an environmental parameter of the first region and an attribute parameter of the virtual object, a neural network model to perform concealment prediction for the first virtual object to obtain a concealment prediction result indicating whether the first virtual object needs to be concealed, the attribute parameter of the virtual object including at least one of the following: location information of first virtual object, location information of an enemy virtual object of the first virtual object, or location information of teammate virtual object of the first virtual object; and the environmental parameter of the first region including terrain information of the first region and a field of view of the first region.

After being trained, the neural network model may be used to predict whether a virtual object needs to be concealed to adapt to a surprise attack or pursuit escape scenario. The neural network model may be trained in the following manner: obtaining an environmental parameter of the virtual scene and battle data of at least two camps, the at least two camps including a losing camp and a winning camp, and the battle data including a location at which a virtual object of the winning camp performs covert behavior, and a location at which a virtual object of the losing camp performs covert behavior; performing data tagging on the battle data to obtain tagged battle data, the location at which the virtual object of the winning camp performs covert behavior being tagged with a probability 1, and the location at which the virtual object of the losing camp performs covert behavior being tagged with a probability 0; and training an initial neural network model based on the environmental parameter of the virtual scene and the tagged battle data to obtain a trained neural network model.

During training of the neural network model, the neural network model may output, based on the environmental parameter of the virtual scene and the battle data, a difference between a predicted probability indicating that concealment is required and a probability actually tagged for the battle data, and may substitute the difference into a loss function (for example, a cross entropy loss function) for backpropagation in the neural network model, to update a parameter of the neural network model layer by layer.

3. Stay duration of the first virtual object in the first region is greater than a duration threshold. For example, the stay duration may be predicted in the following manner: calling, based on an area of the first region and an attribute parameter of the virtual object, a neural network model to perform prediction for the first virtual object to obtain predicted stay duration. The neural network model may be trained in the following manner: obtaining stay time of a virtual object in each region of the virtual scene and an area of each region; and training, by using a large amount of data, an initial neural network model to learn a relationship between stay time and an area to obtain a trained neural network model.

During training of the neural network model, the neural network model may output predicted stay duration based on the stay time of the virtual object in each region of the virtual scene and the area of each region, and may substitute a difference between the predicted stay duration and tagged actual stay duration into a loss function (for example, a cross entropy loss function) for backpropagation in the neural network model, to update a parameter of the neural network model layer by layer.

4. An area of the first region is greater than a suit change area threshold. For example, the area of the first region is less than the suit change area threshold. This means that a virtual object may quickly move from a current region to another region. To avoid frequent switching, if an area of the current region is less than the suit change area threshold, a suit of the virtual object is not switched.

Frequently triggering suit changes by a user by using the manual suit change control and frequent suit changes in the on state of the automatic suit change control are limited in the foregoing solution. This avoids excessively high memory usage of a client, saves computing resources, and improves battery life of a terminal device running the virtual scene.

In response to determining that the color of the first region does not match a color of at least one first component in the first suit, the following processing may be performed: in response to determining that the first region is a preset suit change region for the first virtual object and the wearing position corresponding to the first component is a preset wearing position in the preset suit change region, using a preset component associated with the preset wearing position as the second component, and replacing the first component with the second component.

Herein, a color of the preset component matches the color of the first region.

Figure 7:
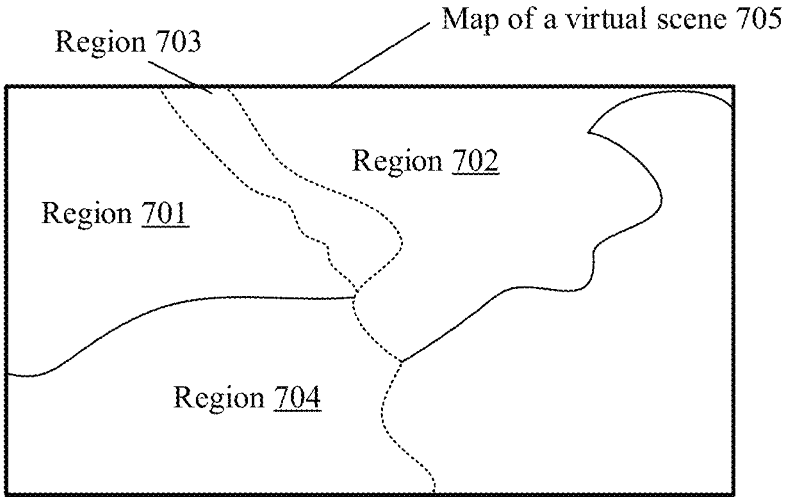
FIG. 7 is a schematic diagram of an example of a map of a virtual scene according to one or more aspects described herein.

For example, to save computing resources, a preset component corresponding to a preset wearing position in each region of the virtual scene may be preset. If a virtual object moves to the region, one or more components, in a suit of the virtual object, that do not match an environmental color may be replaced with a corresponding preset component corresponding to the wearing position. FIG. 7 is a schematic diagram of a map of a virtual scene according to an aspect of this disclosure. In the map 705 of the virtual scene, it is assumed that a region 701 is a snow mountain terrain, a preset wearing position corresponding to the region 701 is an upper body, and a preset component corresponding to the preset wearing position is a white shirt. When the first virtual object moves to the first region, if a color of the component (the first component) on the upper body of the first virtual object does not match the color of the first region, the component on the upper body of the first virtual object may be switched to one that does—for example, a white shirt.

Preset components corresponding to different regions in the virtual scene may be set, and automatic switching may be performed based on a region in which a virtual object is located. This reduces additional operations performed by a user in the virtual scene, so that the user can focus on an interaction operation in the virtual scene, to improve operation efficiency.

In one or more aspects, the entire first suit may be replaced in the following manner: in response to determining that a global replacement condition is met, replacing the entire first suit with a second suit that matches the color of the first region, the global replacement condition including at least one of the following:

1. A corresponding second suit is preset in the first region for the first virtual object. The second suit may be a suit that is manually set by a player and that matches an environmental color, or may be an automatically selected suit with a highest color similarity to the environmental color.

2. An overall replacement instruction for the first suit is received. For example, a player triggers an overall replacement instruction by using the manual suit change control, to replace an entire suit of a virtual object with the second suit.

In one or more aspects, colors of some components in the first suit may be changed in the following manner, so that colors of the components match an environmental color: in response to determining that the color of the first region does not match a color of at least one first component in the first suit and the first component meets a color change condition, replacing the color of the first component with a target color matching the color of the first region.

For example, the target color is determined in at least one of the following manners: extracting a target color based on the color of the first region; or presetting, for the first region, a target color that matches the color of the first region.

The color change condition includes at least one of the following:

1. A color of each candidate component corresponding to the first component does not match the color of the first region, the candidate component being owned by the first virtual object. For example, for a wearing position, when a color similarity between the color of each candidate component and the color of the first region is less than a color similarity threshold, the color of each candidate component corresponding to the first component does not match the color of the first region.

2. The first component has a binding relationship with another component in the first suit. The binding relationship means that components support each other in functions, and a virtual object can complete a complex operation by using the components. When the virtual object wears components with a binding relationship, compared with a case in which the virtual object does not wear any component, an increased attribute parameter of the virtual object may be a sum of attribute parameters of all components plus an attribute parameter corresponding to the binding relationship. If a suit currently worn by the virtual object does include components with a binding relationship, an increased attribute parameter of the virtual object is a sum of attribute parameters of all components.

3. A function of the first component is stronger than that of each candidate component corresponding to the first component, the function including at least one of the following: defense, attack, or a movement speed.

4. The function of the first component is associated with a task currently performed by the first virtual object, the second component having no function corresponding to the task currently performed. For example, a task currently performed by the virtual object requires swimming, the virtual object wears a swimming ring (the first component), and the swimming ring is associated with the task currently performed. If a candidate component does not have a function of a swimming ring, a color of the swimming ring is changed. If a task currently performed by the virtual object requires body armor (the first component) and a color of the body armor does not match an environmental color, the color of the body armor is changed.

Figure 6C:
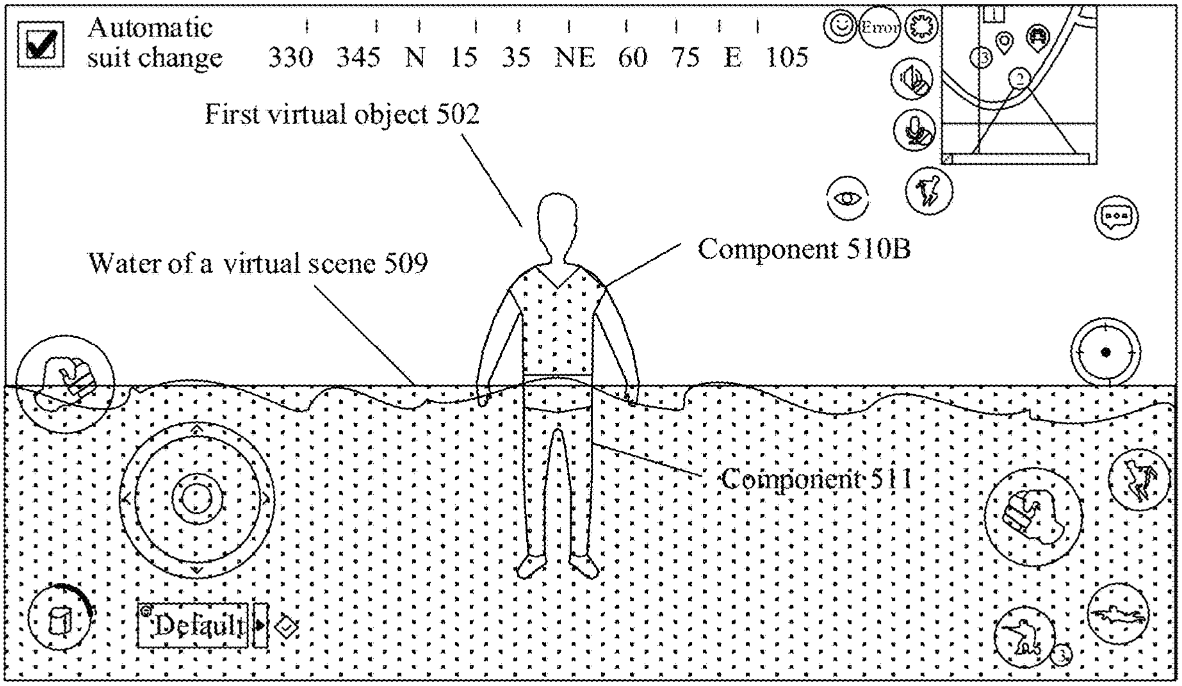

For example, still as shown in FIG. 6A, the first virtual object 502 is in the water in the virtual scene, and a color of the component 510A (a shirt) worn by the first virtual object 502 does not match a color of the virtual scene. If a color of each candidate component for an upper-body position (wearing position) corresponding to the component 510A does not match the color of the first region, the color of the component 510A may be changed color. FIG. 6C is a schematic diagram of a virtual scene interface according to an aspect of this disclosure. A style of the component 510A is not changed, but the color of the component 510A is changed to form a component 510B.

In one or more aspects, in response to determining that the color of the first region does not match a color of at least one first component in the first suit and that the first component does not meet the color change condition, the first component is replaced with the second component.

For example, to change a color of a component, a color of a mapping material of the component needs to be corrected, or a new mapping material needs to be produced. Therefore, to reduce storage space occupied by the mapping material corresponding to the component, the component may be preferentially replaced. When the component does not meet a replacement condition, the color of the component may be replaced.

In one or more aspects of this disclosure, a color of a component is changed to avoid a problem where a virtual object cannot be concealed in a virtual scene because the virtual object does not have a component in a corresponding color.

In one or more aspects, when colors of at least some components in a suit of a virtual object are replaced or at least some components are replaced, a suit change prompt is displayed in at least one of the following manners: a voice prompt, a text message prompt, or a special-effect animation prompt (for example, a fading-away circle of light centered on a replaced component of the virtual object is displayed). As shown in FIG. 6B, the component on the upper body of the first virtual object 502 is replaced with the component 515, and prompt information 516 is displayed in the virtual scene, with content of "Appearance changed".

Figure 4A:
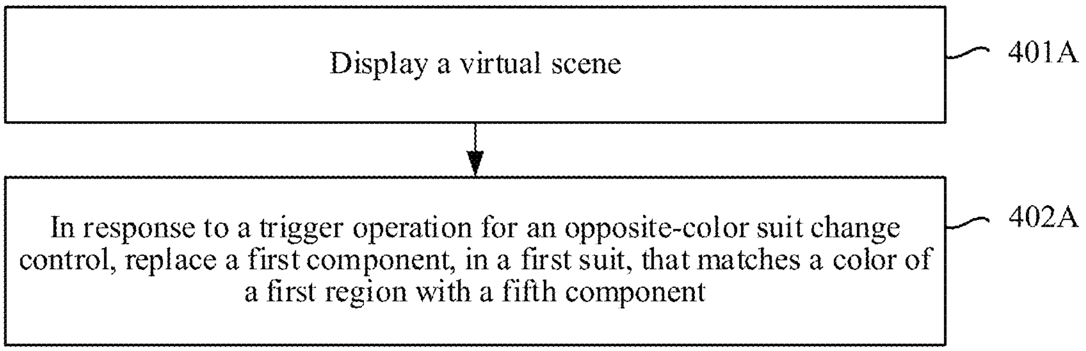
FIG. 4A and FIG. 4B are schematic flowcharts of examples of a suit processing method for a virtual object according to one or more aspects described herein.

FIG. 4A is a schematic flowchart of an example of a suit processing method for a virtual object according to an aspect of this disclosure. The method is described with reference to operations shown in FIG. 4A.

Operation 401A: Display or cause to be displayed a virtual scene.

Herein, the virtual scene may include a first virtual object wearing a first suit, the first suit may include a plurality of components, the plurality of components may be distributed at different positions on the first virtual object, and the virtual scene further may include an opposite-color suit change control.

For example, for processing of operation 401A, refer to operation 301. Details are not described herein again.

Operation 402A: In response to a trigger operation for the opposite-color suit change control, replace a first component, in the first suit, that matches a color of a first region with a fifth component.

The fifth component may be a component whose color is opposite to the color of the first region, and a wearing position for the fifth component may be the same as that for the first component.

For example, colors being opposite means that a color similarity between a color of a component and an environmental color of the first region may be less than a color similarity threshold. The fifth component may be a component, among candidate components corresponding to the first component, that has a lowest color similarity to the first region and whose color is opposite to the color of the first region.

For example, operation 402A may be implemented in the following manner: in response to determining that the first virtual object does not need to be concealed in the first region and receiving the trigger operation for the opposite-color suit change control, replacing the first component, in the first suit, that matches the color of the first region with the fifth component.

Non-limiting examples in which the first virtual object does not need to be concealed include following scenarios: No enemy virtual object exists around the first virtual object. The first virtual object is in a non-combat region. The virtual scene has rainy and snowy weather, and visibility is low. The first virtual object is participating in a multiplayer battle.

In one or more aspects, before operation 402A, the fifth component is determined in the following manner: among a plurality of candidate components in a same wearing position as the first component, selecting a candidate component with a lowest color similarity to the first region as the fifth component.

Figure 6D:
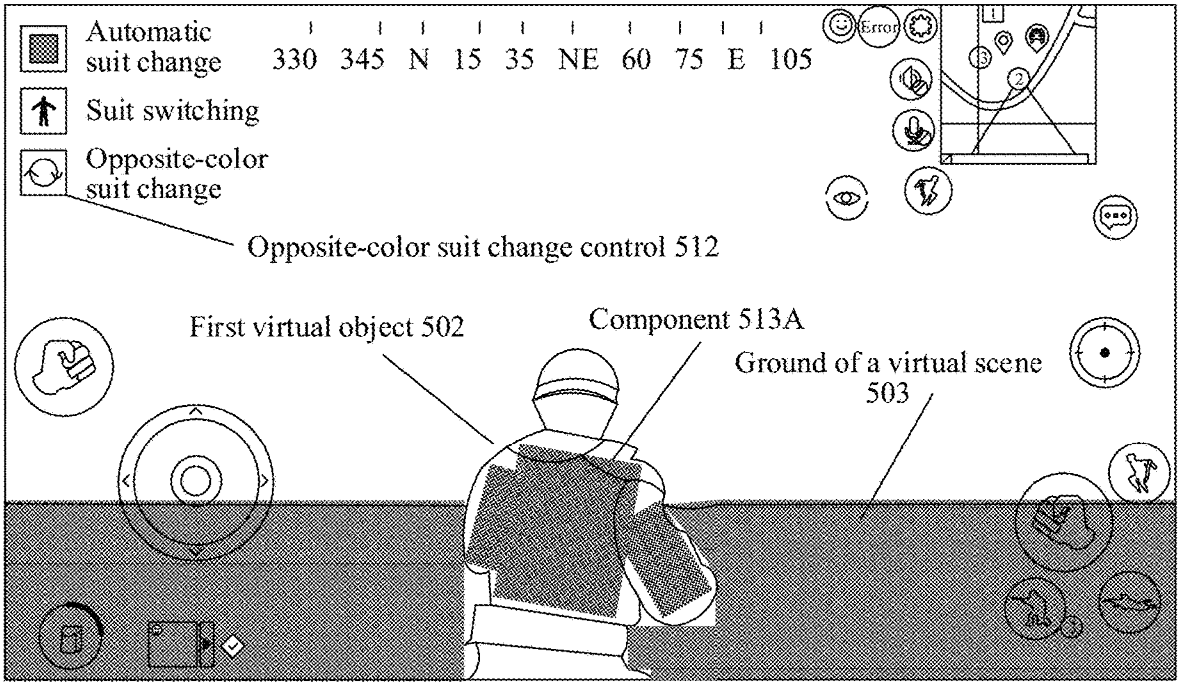
Figure 6E:
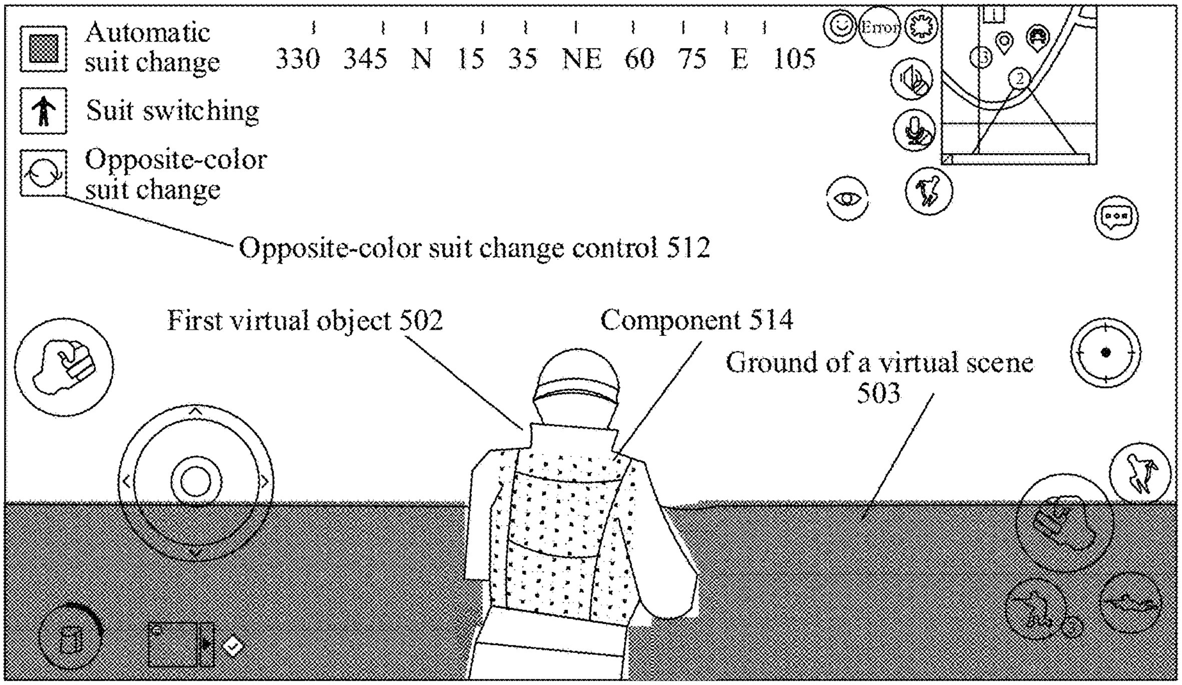

FIG. 6D is a schematic diagram of a virtual scene interface according to an aspect of this disclosure. A first virtual object 502 is in an open plain region. If a user wants to highlight the first virtual object 502 to help a teammate identify the first virtual object 502, the user may trigger an opposite-color suit change control 512 to replace a component 513A that is worn by the first virtual object 502 and that matches an environmental color with a component in an opposite color. A color of the component 513A matches a color of ground 503A in the virtual scene. FIG. 6E is a schematic diagram of a virtual scene interface according to an aspect of this disclosure. The component 513A is replaced with a component 514 that does not match the environmental color, so that the first virtual object 502 is more recognizable in the virtual scene.

In one or more aspects of this disclosure, based on an environmental color of a virtual scene, a component worn by a virtual object may be replaced with a component that does not match the environmental color, so that the virtual object is more recognizable in the virtual scene. This helps the virtual object perform a task that does not require concealment in the virtual scene.

Figure 6F:
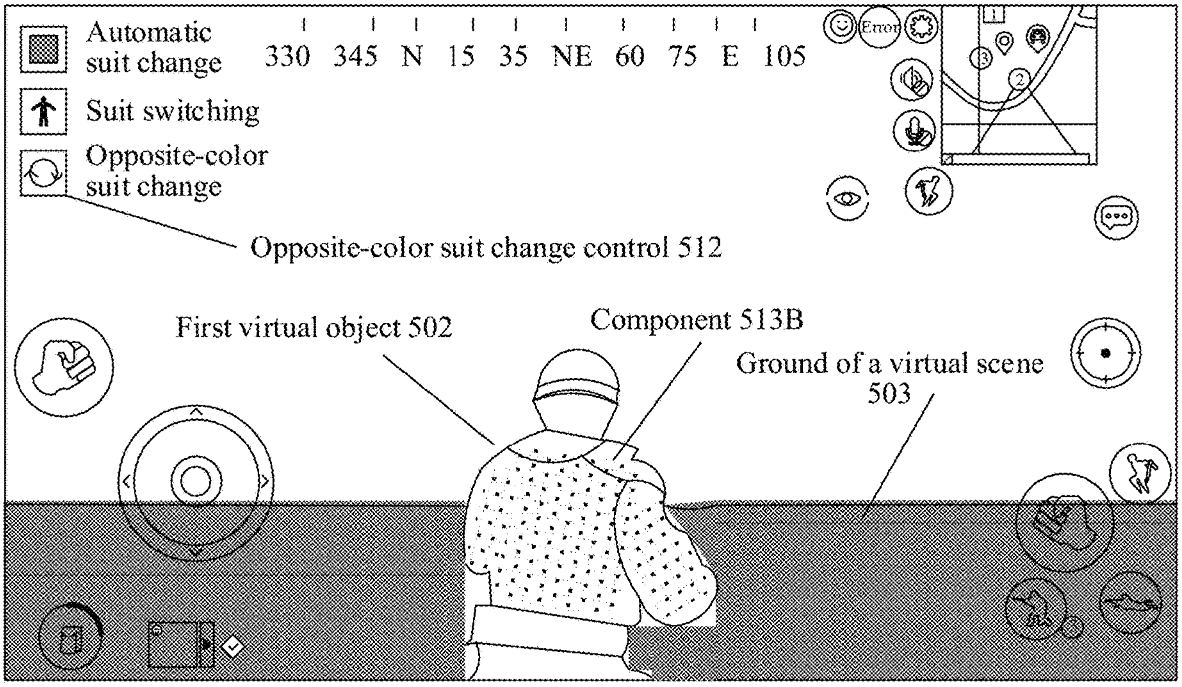

In one or more aspects, a color change condition may also be applicable to a case of replacing a color of a component of a virtual object with a color that does not match an environmental color. FIG. 6F is a schematic diagram of a virtual scene interface according to an aspect of this disclosure. The color of the component 613A of the first virtual object 602 is replaced with a color that does not match the environmental color to form a component 613B.

Figure 4B:
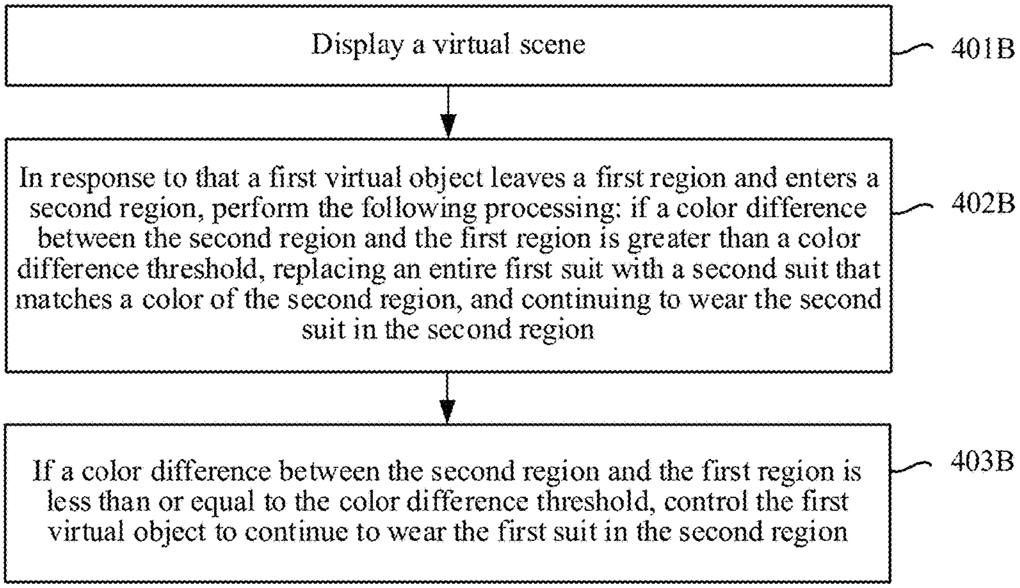

FIG. 4B is a schematic flowchart of an example of a suit processing method for a virtual object according to an aspect of this disclosure. The method is described with reference to operations shown in FIG. 4B.

Operation 401B: Display or cause to be displayed a virtual scene.

Herein, the virtual scene may include a first virtual object wearing a first suit, the first suit may include a plurality of components, and the plurality of components may be distributed at different positions on the first virtual object.

For example, for processing of operation 401B, refer to operation 301. Details are not described herein again.

Operation 402B: In response to determining that the first virtual object leaves a first region and enters a second region, perform the following processing: if a color difference between the second region and the first region is greater than a color difference threshold, replacing the entire first suit with a second suit that matches a color of the second region, and wherein the first virtual object continues to wear the second suit in the second region.

For example, the color difference may be represented as a difference between 1 and a color similarity, and the color difference threshold may be a difference between 1 and a color similarity threshold. The color similarity may be negatively correlated with the color difference, and a higher similarity indicates a smaller difference. For example, if the color similarity threshold is 0.7, the color difference threshold is 0.3. When a color similarity between the first suit and an environmental color is 0.6, the color difference is 0.4, which is greater than the color difference threshold 0.3. In this case, the first suit is replaced with the second suit.

Descriptions are provided below with reference to accompanying drawings. As shown in FIG. 7, it is assumed that a region 701 (the first region) is a snow mountain terrain, a region 704 (the second region) is a desert terrain, the region 701 is adjacent to the region 704, and a color difference between the region 701 and the region 704 is greater than the color difference threshold. In this case, the first suit may be replaced with the second suit that matches the color of the second region, and the second suit continues to be worn in the second region.

Operation 403B: If a color difference between the second region and the first region is less than or equal to the color difference threshold, control the first virtual object to continue to wear the first suit in the second region.

For example, regions of the virtual scene are divided based on scene types (for example, a city, ruins, and a snowfield). In this case, a color difference within each region is less than a color difference between regions. In other words, a color difference within a region may be less than the color difference threshold. When a virtual object enters a region, a suit obtained through replacement may be retained in the region until the virtual object enters another region, or until a color difference between a color of an environment surrounding the virtual object and a color of the first suit is greater than the color difference threshold.

In one or more aspects, the first region is not adjacent to the second region, and a third region exists between the first region and the second region. When the first virtual object is located in the third region, the first virtual object is controlled to continue to wear the first suit.

For example, the third region may be a transition region between the first region and the second region, and a color difference between the third region and the first region may be small. As shown in FIG. 7, a region 703 (the third region) exists between the region 701 (the first region) and the region 702 (the second region). It is assumed that the third region is a snow terrain, and a color difference between the third region and the first region is small. When the first virtual object is located in the third region, the first virtual object is controlled to continue to wear the first suit.

In one or more aspects, before the continuing to wear the second suit in the second region, if a color distribution difference of the second region is less than or equal to a color difference threshold, the processing of controlling the first virtual object to continue to wear the second suit is performed.

For example, colors distributed at different locations in the second region may be different. If a color difference between locations is less than or equal to the color difference threshold, the processing of controlling the first virtual object to continue to wear the second suit is performed.

Before the entire first suit is replaced with the second suit that matches the color of the second region, if a local replacement condition is not met, the processing of replacing the entire first suit with the second suit that matches the color of the second region may be performed.

If the local replacement condition is met, a third component in the first suit may be replaced with a fourth component, a color of the fourth component matching the color of the second region, and a wearing position for the fourth component being the same as that for the third component. The third component may be determined in at least one of the following manners: 1. In response to a selection operation for any component in the first suit, the selected component may be used as the third component. 2. A component with a largest color difference from other components in the first suit may be used as the third component. For example, a color similarity between every two components in the first suit may be calculated. For each component, a sum of color similarities between the component and other components may be obtained. A component with a smallest sum of similarities may be used as a component with a largest color difference from other components. 3. A component with a smallest performance parameter in the first suit may be used as the third component. The performance parameter includes at least one of the following: a defense performance parameter, an attack performance parameter, a virtual object level required for wearing the component, or a movement speed performance parameter.

The local replacement condition includes at least one of the following:

1. The first virtual object does not have a corresponding second suit in the second region. For example, the not having a corresponding second suit means that no second suit corresponding to the second region is preset.

2. A quantity of components that do not match the color of the second region is less than a replacement quantity threshold. The replacement quantity threshold is positively correlated with a total quantity of components in a suit, and the replacement quantity threshold may be half of the total quantity of components. For example, the suit has six components, including a hat, gloves, shoes, a shirt, trousers, and a virtual attack prop; and the replacement quantity threshold is 3. When a quantity of components that do not match the color of the second region is less than 3, only the components are replaced, instead of performing overall replacement.

3. The third component has no binding relationship with other components in the first suit. The binding relationship means that components support each other in functions, and a virtual object can complete a complex operation by using the components. When the virtual object wears components with a binding relationship, compared with a case in which the virtual object does not wear any component, an increased attribute parameter of the virtual object is a sum of attribute parameters of all components plus an attribute parameter corresponding to the binding relationship. If a suit currently worn by the virtual object does include components with a binding relationship, an increased attribute parameter of the virtual object is equal to a sum of attribute parameters of all components.

In one or more aspects of this disclosure, at least some components in a suit of a virtual object may be replaced with a component that matches an environmental color of a virtual scene. In this way, a component in the suit of the virtual object automatically changes with a color of a scene in a game, a possibility of the virtual object being exposed in the virtual scene is reduced, and adverse interference caused by abundant suit components to a battle is avoided. A user may enable automatic replacement of a concealed suit. This reduces operation and thinking costs in the battle, and improves the game experience for the user.

The following describes an example application of one or more aspects of this disclosure in a real application scenario.

The suit processing method for a virtual object in one or more aspects of this disclosure may be applied to the following application scenario:

In a virtual scene, a player may perform a suit change for a virtual object controlled by the player. The player may perform a suit change for the virtual object by selecting components for different wearing positions on the virtual object from a game warehouse. In a game battle, the player may also perform a suit change for the virtual object by picking up a care package in the virtual scene to obtain a component. Terrains and environments in the virtual scene are changeable, and the player needs to pay constant attention to an environmental change and a trend of an enemy virtual object. The player cannot spare much time or energy to match components in the suit of the virtual object. Consequently, it is difficult for the virtual object to quickly wear a required suit (for example, a highly concealed suit) in the virtual scene, and no means of quick suit changes is available. In the suit processing method for a virtual object in this application, a component in a suit of a virtual object may be switched based on a color of the virtual scene during a game battle, and a component that does not match an environmental color is replaced with a component that matches the environmental color, to improve a degree of concealment of the virtual object in the virtual scene.

For example, a virtual scene may include a virtual object, and the virtual object may wear a suit. The suit is the dress of the virtual object in a game. The suit may include various components. The components are items worn by the virtual object, for example, a shirt, trousers, and shoes. In one or more aspects of this disclosure, the suit includes all equipment, clothes, and pendants on the virtual object. Other forms of pets and accompanying items may appear based on different games. They all fall within the scope of solutions of this application provided that their colors can be changed intelligently based on a scene. A warehouse for the virtual object includes a warehouse for storing battle props (the warehouse stores a ghillie suit (clothes for camouflage) and a player's clothes warehouse).

The virtual scene further includes an automatic suit change control and a manual suit change control. In the suit processing method for a virtual object in one or more aspects of this disclosure, a color of a region in which a virtual object is located in a game may be intelligently identified, a color type and a proportion of each color are determined, and an automatic or manual suit change may be implemented based on a color of a region in the virtual scene. The automatic mode is as follows: The automatic suit change control option may be set to an on state, and a component in current dress of the virtual object may be automatically switched to a component that matches an environmental color of a current scene. The manual mode is as follows: When a user triggers the manual suit change control, a component in current dress of the virtual object may be switched to a component that matches an environmental color of a current scene.

Figure 9:
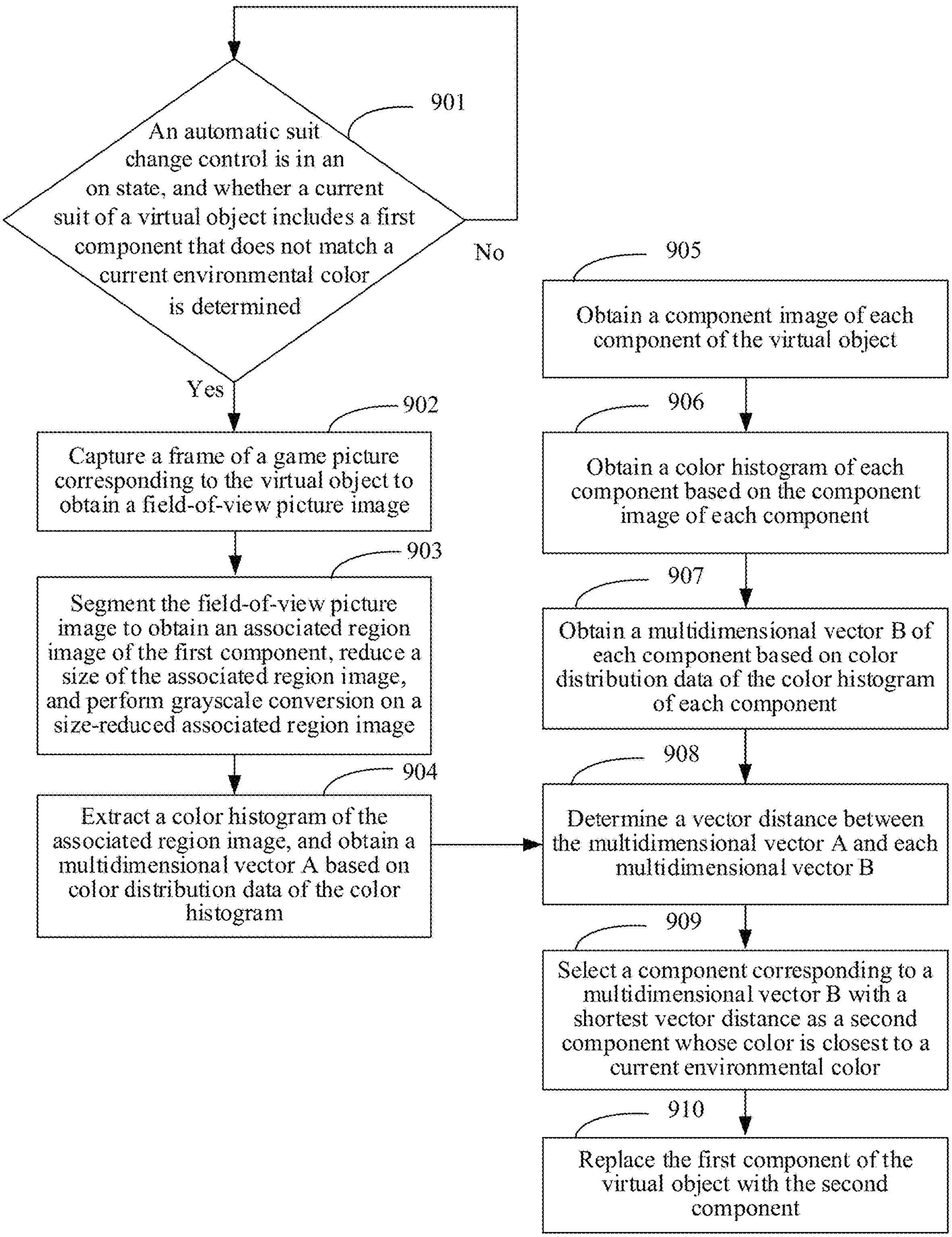
FIG. 9 is a schematic flowchart of an example of a suit processing method for a virtual object according to one or more aspects described herein.

FIG. 9 is a schematic flowchart of a suit processing method for a virtual object according to an aspect of this disclosure. The method is described with reference to operations shown in FIG. 9 and by using an example in which the method is performed by a terminal device.

Operation 901: An automatic suit change control is in an on state, and whether a current suit of a virtual object includes a first component that does not match a current environmental color is determined.

For example, before the virtual object enters a game battle, a user may match a suit for the virtual object; or when the virtual object enters a game battle, the virtual object does not wear any suit component or wears components only at some of wearing positions. When the automatic suit change control is in the on state, in response to determining that the virtual object moves from a current region to another region, the processing of determining whether the current suit of the virtual object includes a first component that does not match the current environmental color is performed. Alternatively, when a time interval between a previous moment at which determining is performed and a current moment reaches preset duration (for example, 10 seconds), the processing of determining whether the current suit of the virtual object includes a first component that does not match the current environmental color is performed.

For example, the automatic suit change control may be a control for indicating whether an automatic suit change function is enabled. When the automatic suit change control is in the on state, an automatic suit change mode may be enabled, and the automatic suit change function may be performed. On the contrary, when the automatic suit change control is in an off state, the automatic suit change function is not performed. In the automatic suit change mode, a component corresponding to each wearing position on a virtual object (the foregoing first virtual object) of a player may be automatically compared with an environment closest to the wearing position, to determine whether colors of the component and the environment match. That the colors match means that a color difference between the component and the environment is small. To be specific, a color similarity between a color of the component and an environmental color may be greater than or equal to a similarity threshold. The similarity threshold may be 0.5 (a value range of a similarity is as follows: $1 \geq \text{similarity} \geq 0$). When the color similarity between the color of the component and the environmental color is less than the similarity threshold, the component does not match the environmental color.

When a determining result in operation 901 is yes, operation 902 may be performed. When a determining result in operation 901 is no, operation 901 may be performed again to determine whether the current suit of the virtual object includes a first component that does not match the current environmental color.

Operation 902: Capture a frame of a game picture corresponding to the virtual object to obtain a field-of-view picture image.

For example, to reduce performance consumption, when the virtual object is in a game battle, a frame of a game picture in a field of view of the virtual object may be captured at an interval of preset duration (for example, 10 seconds) to obtain the field-of-view picture image. To improve accuracy of obtaining a multidimensional color vector, the field-of-view picture image does not include a control in a virtual scene.

Operation 903: Segment the field-of-view picture image to obtain an associated region image of the first component, reduce a size of the associated region image, and perform grayscale conversion on a size-reduced associated region image.

For example, the field-of-view picture image may be segmented in the following manner: cutting a virtual object and an environmental interference factor from the field-of-view picture image to obtain a global environmental image of a virtual scene in a game picture (for example, the field-of-view picture image includes a virtual object, sky of a virtual scene, a virtual building, a virtual vehicle (for example, a virtual aircraft or a car), ground of the virtual scene, the virtual object and the sky are cut from the field-of-view picture image, and a field-of-view picture image obtained through cutting is used as the global environmental image). A region associated with each position on the virtual object in the global environmental image may be determined, and the global environmental image may be segmented to obtain an associated region image of each position. A size of the associated region image is reduced to a preset size (for example, 8 pixels×8 pixels, namely, 64 pixels in total; or 16 pixels×16 pixels, namely, 256 pixels in total), to eliminate impact of image details on the picture. The grayscale conversion may be performed in the following manner: down-sampling the size-reduced associated region image based on a preset grayscale level (for example, 64-level or 256-level) to obtain a grayscale-processed associated region image. A maximum quantity of types of colors in the grayscale-processed associated region image may be equal to the grayscale level. For example, for an 8 pixels×8 pixels size-reduced image, the size-reduced associated region image is down-sampled based on a preset 64-level grayscale to obtain a grayscale-processed associated region image. A maximum quantity of types of colors in the image is 64.

Operation 904: Extract a color histogram of the associated region image, and obtain a multidimensional vector A based on color distribution data of the color histogram.

For example, the color histogram of the associated region image may be extracted in the following manner: counting a proportion of each color in the grayscale image, and producing the color histogram based on the proportion corresponding to each color. Producing a color histogram is a manner of counting color data. During specific implementation, the color data may alternatively be counted by using a table, a pie graph (an angle corresponding to a sector for each color represents a proportion of the color), or the like.

FIG. 8 is a schematic diagram of a color histogram according to an aspect of this disclosure. Lengths of bars in the color histogram represent proportions of different types of colors in the associated region image. S1, S2, S3, S4, S5, S6, S7, S8, S9, and S10 correspond to different color systems. Each color system includes a plurality of types of colors, and each color system corresponds to a same quantity of types of colors.

For example, dimensionality of a multidimensional vector (the foregoing color vector) may be determined based on precision required for game recognition, and the precision may be positively correlated with the dimensionality. In one or more aspects of this disclosure, an example in which the multidimensional vector is a six-dimensional vector is used for description. Proportion values of all colors in the color histogram may be combined into a color histogram vector (the foregoing color proportion vector) corresponding to the color histogram. Each color may correspond to one dimension. A total quantity of dimensions of the color histogram vector may be the same as a quantity of types of colors in the color histogram. The color histogram vector may be mapped in a dimensionality reduction manner based on preset dimensions (for example, six dimensions) to obtain a six-dimensional vector (the foregoing dimensionality-reduced color vector).

A proportion of each color in the color histogram may be used as a value corresponding to each dimension in the vector, to obtain the color histogram vector corresponding to the color histogram. To be specific, proportion values corresponding to all colors in the color histogram may be combined into a vector to obtain the color histogram vector, a total quantity of dimensions of the color histogram vector being the same as a quantity of types of colors in the color histogram. The mapping in the dimensionality reduction manner may be implemented in the following manner: All colors in the color histogram vector may be divided into six color intervals. Weighted summation may be performed on each proportion value in each color interval. A weighted summation result corresponding to each color interval may be normalized. All normalization results may be combined into a six-dimensional vector.

For example, the color histogram may be denoted as a color dataset X. X={x1, x2, . . . , xn}. Xi is a color proportion (proportion value) corresponding to an $i^{th}$ color in the color dataset, and a value range of the color proportion is (1≥xi≥0). Colors in the color dataset may be sorted based on color systems of the colors. For example, the color dataset includes seven colors that are sequentially sorted as follows: red, orange, yellow, green, cyan, blue, and violet. In one or more aspects of this disclosure, 64 colors are used as an example for description. The color dataset X={x1, x2, . . . , x64} may be converted into a color histogram vector (x1, x2, . . . , x64). The color histogram vector corresponds to 64 dimensions. All colors in the 64-dimensional color histogram vector may be divided into six color intervals. A weighted summation result for a proportion value of each color in the six color intervals may be obtained. Obtained six weighted summation results may be normalized to obtain six normalization results: c, d, e, f, g, and h. In this case, the six-dimensional vector is denoted as A=(c, d, e, f, g, h).

In one or more aspects, a mapping material image of an object closest to a component in the virtual scene may alternatively be obtained, a color histogram is obtained based on the mapping material, and a multidimensional vector A is obtained based on the color histogram. For example, shoes of the virtual object are closest to ground of the virtual scene, and the multidimensional vector A is obtained based on a mapping material image of the ground.

For example, operation 905 to operation 907 may be performed before operation 901. Color information of each component owned by the virtual object may be obtained in advance (represented in the form of a multidimensional color vector), and the color information may be stored in a database. For example, a plurality of components may constitute a suit. For each component, a mapping material of an outer surface of the component may be tiled to form a component image, and a multidimensional color vector may be obtained based on the component image. When a player obtains a new component, a multidimensional color vector corresponding to the new component may also be stored in the database.

Operation 905: Obtain a component image of each component of the virtual object.

For example, when the virtual scene is a two-dimensional virtual scene and a component is also a two-dimensional component, three views or front and rear views of the component may be tiled to form a component image; or when a component is a three-dimensional component, mapping materials of all outer surfaces of the component may be obtained and tiled to form a component image.

Operation 906: Obtain a color histogram of each component based on the component image of each component.

Operation 907: Obtain a multidimensional vector B of each component based on color distribution data of the color histogram of each component.

Dimensionality of the multidimensional vector B may be the same as that of the multidimensional vector A. Principles of operation 906 and operation 907 may be the same as that of operation 904. Details are not described herein again. It is assumed that the multidimensional vector B is a six-dimensional vector, and an $i^{th}$ multidimensional vector Bi is denoted as B=(Ci, Di, Ei, Fi, Gi, Hi).

Operation 908: Determine a vector distance between the multidimensional vector A and each multidimensional vector B.

A color similarity between a component and an environment may be represented by a vector distance between color vectors, and a matching degree may be negatively correlated with the color similarity. A distance between the multidimensional vector A and each multidimensional vector B may be calculated. Two vectors with a smallest vector distance have a highest color similarity.

A vector distance x between the multidimensional vector A and the multidimensional vector Bi may be expressed as the following formula (1):

$$x = \sqrt{(c - Ci)^2 + (d - Di)^2 + (e - Ei)^2 + \dots + (h - Hi)^2} \quad (1)$$

Operation 909: Select a component corresponding to a multidimensional vector B with a shortest vector distance as a second component whose color is closest to a current environmental color.

For example, when x is the smallest, a component corresponding to the multidimensional vector Bi may be a component, for the wearing position, that best matches an environmental color. A component that does not match the environmental color is replaced with the component that best matches the environmental color.

Operation 910: Replace the first component of the virtual object with the second component.

The second component and the first component may correspond to a same wearing position. For the wearing position, the second component may be a component that is owned by the virtual object and that has a highest color similarity to an environmental color of a virtual scene. After the first component is replaced with the second component, prompt information may be displayed on a virtual scene interface to notify a player that a component worn by the virtual object has been replaced.

FIG. 5A is a schematic diagram of an example of a virtual scene interface according to an aspect of this disclosure. A first virtual object 502 is in the virtual scene. An environmental color of the virtual scene may be determined based on ground 503, in the virtual scene, on which the first virtual object 502 stands. A component 501 is a component on a head (wearing position) of the virtual object, for example, a helmet. The component 501 may not match the environmental color of the virtual scene. FIG. 5B is a schematic diagram of an example of a virtual scene interface according to an aspect of this disclosure. The component 501 may be replaced with a component 504 that matches the color of the virtual scene.

In one or more aspects of this disclosure, at least some components in a suit of a virtual object may be replaced with a component that matches an environmental color of a virtual scene, to improve a degree of concealment of the virtual object in the virtual scene, and facilitate quick suit changes for the virtual object during a game battle.

In one or more aspects, when an automatic suit change control is in an off state, a user may trigger the automatic suit change control if the user visually perceives that a color of a suit of a virtual object is different from an environmental color of a virtual scene. In response to a trigger operation for the automatic suit change control, a component, in the suit of the virtual object, whose color is different from the environmental color may be replaced with a component that matches the environmental color. Alternatively, in response to a trigger operation for the automatic suit change control, the suit of the virtual object may be replaced with a suit preset by a player.

In one or more aspects, an automatic suit change control and a manual suit change control in a virtual scene may be displayed in the virtual scene. FIG. 5C is a schematic diagram of a virtual scene interface according to an aspect of this disclosure. An automatic suit change control 505 and a manual suit change control 506 may be displayed in the virtual scene as floating layers. To avoid excessive consumption of computing resources caused by frequent automatic suit changes, cooling time may be set for execution of a suit change function. When the cooling time has not elapsed, a suit change control may be displayed in a cooldown state. A maximum quantity of suit changes may be further set. In one game battle, if a quantity of suit changes for a virtual object reaches the maximum quantity of suit changes, suit changes in an automatic suit change mode may be prohibited, and suit changes triggered by using the manual suit change control may be prohibited (the manual suit change control is displayed in a disabled state), to avoid occupying running memory of a client and save computing resources.

FIG. 5D is a schematic diagram of control states according to an aspect of this disclosure. When an automatic suit change control is in an on state, an automatic suit change function may be performed. After at least automatic component switching is performed in a suit, if a current quantity of suit changes reaches a maximum quantity (for example, 10) of suit changes, the automatic suit change control may switch from the on state to an off state, no automatic suit change function may be performed, and when a trigger operation for enabling the automatic suit change control is received, no response may be performed. After at least automatic component switching is performed in a suit, if a current quantity of suit changes does not reach the maximum quantity of suit changes, the automatic suit change control may enter a cooldown state. In the cooldown state, no automatic suit change function may be performed, and a countdown corresponding to preset cooldown duration may be displayed on the automatic suit change control, until the preset cooldown duration (for example, 60 seconds) ends. When the preset cooldown duration elapses, the automatic suit change control may be restored to the on state.

Similarly, if a current quantity of suit changes does not reach the maximum quantity of suit changes, a manual suit change control may be in an available state, and at least some components in a suit of a virtual object may be switched in response to a trigger operation for the manual suit change control. If a current quantity of suit changes reaches the maximum quantity (for example, 10) of suit changes, the manual suit change control may be displayed in a disabled state (as shown in FIG. 5D, the disabled state may be represented as performing display in a grayscale state or displaying a disabled sign on the manual suit change control). After at least automatic component switching is performed in the suit, if a current quantity of suit changes does not reach the maximum quantity of suit changes, the manual suit change control may enter a cooldown state. In the cooldown state, the manual suit change control cannot be triggered, and a countdown corresponding to preset cooldown duration may be displayed on the manual suit change control, until the preset cooldown duration (for example, 60 seconds) ends. When the preset cooldown duration elapses, the manual suit change control may be restored to the available state.

In one or more aspects, if a current quantity of suit changes reaches the maximum quantity of suit changes, the automatic suit change control or the manual suit change control may alternatively be hidden to indicate that the automatic suit change control or the manual suit change control is disabled.

In one or more aspects, an automatic suit change control and a manual suit change control in a virtual scene may be displayed on a warehouse interface of the virtual scene. The warehouse interface may be configured for storing a virtual prop and a component that are owned by a virtual object. On the warehouse interface, a player may view the virtual prop and the component that are owned by the virtual object. FIG. 5E is a schematic diagram of a warehouse interface according to an aspect of this disclosure. A warehouse control 507 is set in a virtual scene. A warehouse interface 508 may be displayed in response to a trigger operation for the warehouse control 507. The warehouse interface 508 may include an item bar and a clothes bar. The item bar stores a virtual prop component and a virtual equipment component that are owned by a virtual object. The clothes bar stores a clothes component owned by the virtual object. When an automatic suit change control 505 is in an on state, an automatic suit change function may be performed. In response to a trigger operation for a manual suit change control 506, at least some components in a suit of the virtual object may be replaced with a component that matches an environmental color. Alternatively, the suit of the virtual object may be replaced with a preset suit corresponding to the manual suit change control 506, and “In use” may be displayed on the manual suit change control 506 to indicate that the preset suit is in use.

In one or more aspects of this disclosure, the automatic suit change control and the manual suit change control may be set on the warehouse interface to prevent a plurality of controls from blocking a picture of the virtual scene.

In one or more aspects, when the automatic suit change control is in an on state, if no component is worn at a wearing position on the virtual object, a component that best matches an environmental color of a current region may be automatically put on the wearing position, the component being a component corresponding to the wearing position. For example, when the virtual object enters a game battle, if the virtual object wears only a shirt and trousers and does not wear any component on feet and the head, shoes and a hat that match an environmental color of a current region may be automatically put on the virtual object; or if the virtual object does not wear any component, a suit that matches an environmental color of a current region may be automatically matched for the virtual object.

In one or more aspects, after a player enables an automatic suit change function, if a virtual object has not been dressed, a suit whose color is closest to an environmental color of a current region may be automatically matched and automatically worn. If the virtual object has been dressed and some components in dress do not match the environmental color, each of the components may be replaced, based on an environment, with a component that matches the environmental color. If none of components matches the environmental color, an entire suit may be replaced.

In one or more aspects, use of the automatic suit change control and use of the manual suit change control are not mutually exclusive, and in an automatic suit change mode, an entire suit or some components in the suit may be switched by using the manual suit change control. For example, a user selects any component in a suit of a virtual object as a to-be-replaced component and triggers the manual suit change control to replace the to-be-replaced component with another component associated with the manual suit change control. The another component may be a component that meets any one of the following conditions: a component that better matches a color of a current region than the to-be-replaced component, a component with a better performance parameter than the to-be-replaced component, a component used more frequently than the to-be-replaced component, a component whose color is opposite to determining that of the to-be-replaced component, a component preferred by the user, or the like.

In one or more aspects, when the automatic suit change control is in an on state, if a player puts any component (for example, a component preferred by the player) on a virtual object by using the manual suit change control, no automatic suit change function is to be performed within preset duration. In response to determining that the preset duration elapses and an environmental color of a virtual scene does not match colors of at least some components in a suit of the virtual object, the at least some components may be switched to a component that best matches a current environmental color.

In one or more aspects, when a position on the virtual object is obscured by the virtual scene, a component at the position may not be replaced. FIG. 6A is a schematic diagram of a virtual scene interface according to an aspect of this disclosure. A first virtual object 502 is wearing a component 511 and a component 510A. Legs of the first virtual object are under a water surface 509 in the virtual scene. In this case, the component 511 is obscured by water in the virtual scene. Above the water surface, it is difficult to identify a color of an underwater environment. Only the component 510A of the first virtual object 502 that is not obscured may be replaced. FIG. 6B is a schematic diagram of a virtual scene interface according to an aspect of this disclosure. The component 510A is replaced with a component 515 that matches a color of the virtual scene, and the component 511 obscured by the water is not replaced. After a component is replaced, prompt information 516 (as shown in FIG. 6B, content of the prompt information may be “Appearance changed”) may be further displayed to notify a player that a component in a suit of a virtual object have been changed.

In one or more aspects of this disclosure, only a component, not obscured by a virtual scene, of a virtual object may be switched. This avoids frequent replacement of components worn by the virtual object, and reduces frequency of determining a similarity between an environmental color and a color of the suit, to reduce consumption of computing resources and memory usage of a client.

In the following scenarios, a user may have a requirement for improving recognizability of a first virtual object: A plurality of virtual objects are in a multiplayer battle, the first virtual object is in a group action with a teammate virtual object, the first virtual object is in a region beyond a game battle, or visibility of the virtual object is affected by a weather factor or an environmental factor (for example, rainy or snowy weather, or smoke) in a virtual scene. In the foregoing scenarios, the user may need to distinguish the first virtual object from other virtual objects or virtual scenes.

In one or more aspects, the virtual scene further includes an opposite-color suit change control. A user may trigger the opposite-color suit change control to partially or entirely switch a suit of a virtual object to a suit whose color is opposite to an environmental color of a virtual scene. That colors are opposite means that a color similarity is low. A component with a lowest color similarity to an environmental color of a current region may be selected from components owned by the virtual object as an opposite-color component (the foregoing fifth component) whose color is opposite to the environmental color of the virtual scene. A component currently worn by the virtual object may be replaced with the opposite-color component to improve recognizability of the virtual object in the virtual scene.

FIG. 6D is a schematic diagram of a virtual scene interface according to an aspect of this disclosure. Assuming that a current region is grassland, an environmental color of a virtual scene may be determined based on ground 503 of the virtual scene in this region. The ground 503 of the virtual scene is in a grass green color. A component 513A worn by a virtual object 502 is a component that matches the color of the ground 503 of the virtual scene. For example, the component 513A may be a green camouflage suit. In response to a trigger operation for an opposite-color suit change control 512, the component 513A worn on an upper body of the first virtual object 502 may be replaced with a component that does not match the environmental color of the virtual scene. FIG. 6E is a schematic diagram of a virtual scene interface according to an aspect of this disclosure. The component 513A on the virtual object 502 is replaced with a component 514 that does not match the environmental color of the virtual scene, so that the virtual object 502 is more recognizable in the virtual scene.

In one or more aspects of this disclosure, at least some components in a suit of a virtual object may be replaced with a component that does not match an environmental color of a virtual scene, so that the virtual object is more recognizable in the virtual scene. This helps a user observe the virtual object, helps distinguish the virtual object from the virtual scene and other virtual objects, and can improve efficiency of human-computer interaction of controlling the virtual object by a user.

In one or more aspects, regions of the virtual scene may be divided based on scene types (for example, a city, ruins, and a snowfield). A color difference within each region is less than a color difference between regions. When a virtual object enters a region, a suit of the virtual object may be partially or entirely replaced based on a color corresponding to the region, and a suit obtained through replacement may be retained in the region until the virtual object enters another region.

Descriptions are provided below with reference to accompanying drawings. FIG. 7 is a schematic diagram of a map of a virtual scene according to an aspect of this disclosure. In the map 705 of the virtual scene, it is assumed that a region 701 is a snow mountain, a region 702 is a grassland, and a region 704 is a desert. A region 703 exists between the region 701 and the region 702. It is assumed that a color difference within each of the three regions is small (a color similarity is greater than a color similarity threshold) but a color difference between regions is large (a color similarity is less than the color similarity threshold). A color of a mapping material in the virtual scene may be fixed. Therefore, before a virtual object enters a game battle, suits or components that match colors of different regions may be predetermined based on components owned by the virtual object. Suits that match corresponding colors are respectively set for the region 701, the region 702, and the region 704. A color similarity between colors of some locations in the region 703 and the region 701 may be less than the color similarity threshold, and a color similarity between colors of some locations and the region 701 may be greater than the color similarity threshold.

When a virtual object enters the region 701, some components in a first suit of the virtual object may be switched to preset components that match an environmental color of a snow mountain scene in the region 701 to form a third suit, and the virtual object continues to wear the third suit in the region 701; or the entire first suit may be switched to a second suit that matches the environmental color, and the virtual object continues to wear the second suit in the region 701. When the virtual object enters the region 703, in response to a mismatch between an environmental color and a color of a component in a suit of the virtual object, the suit of the virtual object may be switched to a suit that matches the environmental color.

In one or more aspects of this disclosure, a component in a suit of a virtual object may be switched based on region switching in a virtual scene. This reduces frequency of determining a similarity between an environmental color and a color of the suit, to reduce consumption of computing resources and memory usage of a client.

In one or more aspects of this disclosure, at least some components in a suit of a virtual object may be replaced with a component that matches an environmental color of a virtual scene. In this way, a component in the suit of the virtual object automatically changes with a color of a scene in a game, a possibility of the virtual object being exposed in the virtual scene is reduced, and adverse interference caused by abundant suit components to a battle is avoided. A user may enable automatic replacement of a concealed suit. This reduces operation and thinking costs in the battle, and improves game experience for the user.

The following further describes an exemplary structure of the suit processing apparatus 455 for a virtual object in one or more aspects of this disclosure when the apparatus is implemented as software modules. In one or more aspects, as shown in FIG. 2, software modules of the suit processing apparatus 455 for a virtual object that are stored in the memory 450 may include: a display module 4551, configured to display a virtual scene, the virtual scene including a first virtual object wearing a first suit, the first suit including a plurality of components, and the plurality of components being distributed at different positions on the first virtual object; and a suit switching module 4552, configured to: in a period in which the first virtual object is located in a first region in the virtual scene, replace a first component in the first suit with a second component in response to determining that a color of the first region does not match a color of the first component. Herein, a color of the second component matches the color of the first region, and a wearing position for the second component is the same as that for the first component.

In one or more aspects, the virtual scene further includes an automatic suit change control; and the suit switching module 4552 may be configured to display the automatic suit change control in an on state in response to an enabling operation for the automatic suit change control, and automatically replace the first component in the first suit with the second component in response to determining that the color of the first region does not match the color of the first component.

In one or more aspects, the virtual scene further includes a manual suit change control; and the suit switching module 4552 may be configured to: in response to a trigger operation for the manual suit change control, replace the first component in the first suit with a third component, and retain a switched-to first suit within a wearing duration threshold, the third component being any component whose wearing position is the same as that for the first component; and in response to determining that duration in which the switched-to first suit is retained reaches the wearing duration threshold and the color of the first region does not match a color of the third component in the first suit, replace the third component with a fourth component, a color of the fourth component matching the color of the first region, and a wearing position for the fourth component being the same as that for the third component.

In one or more aspects, the suit switching module 4552 may be configured to: before responding to the trigger operation for the manual suit change control, determine the first component in any one of the following manners: in response to a selection operation for any component in the first suit, using the selected component as the first component; using a component with a largest color difference from other components in the first suit as the first component; or using a component with a smallest performance parameter in the first suit as the first component.

In one or more aspects, the virtual scene further includes a manual suit change control; and the suit switching module 4552 may be configured to: display the manual suit change control in an available state in response to determining that a manual suit change condition is met, the manual suit change condition including at least one of the following: a time interval between a current moment and a suit change moment of a previous suit change is greater than or equal to an interval threshold; and a quantity of suit changes of the first virtual object does not reach a maximum quantity of suit changes; and replace the first component in the first suit with the second component in response to determining that the color of the first region does not match the color of the first component and a trigger operation for the manual suit change control is received.

In one or more aspects, the suit switching module 4552 may be configured to: in response to determining that the manual suit change condition is not met, display the manual suit change control in a disabled state in any one of the following manners: hiding the manual suit change control; displaying the manual suit change control in gray; or displaying a disabled sign on the manual suit change control.

In one or more aspects, the suit switching module 4552 may be configured to: before replacing the first component with the second component, obtain a plurality of candidate components configured for a same wearing position as the first component; and use a candidate component meeting a screening condition among the plurality of candidate components as the second component, the plurality of candidate components being owned by the first virtual object, the screening condition including any one of the following: a function of the candidate component is the same as that of the first component; a wearing position for the first component is not obscured by a virtual environment; or a color similarity between the candidate component and the first region is greater than a color similarity threshold.

In one or more aspects, the suit switching module 4552 may be configured to: before replacing the first component with the second component, determine the color similarity in the following manner: determining a color vector of an associated region of the first component in the first region; and determining a vector distance between a color vector of each candidate component and the color vector of the associated region, the vector distance being configured for representing a color similarity between the candidate component and the first region, and the vector distance being negatively correlated with the color similarity.

In one or more aspects, the suit switching module 4552 may be configured to: obtain a field-of-view picture image corresponding to the first virtual object; segment the field-of-view picture image based on an associated region of the wearing position for the first component, to obtain an associated region image; convert the associated region image to obtain color proportion data of the associated region image; and perform feature extraction on the color proportion data to obtain a color vector of the associated region.

In one or more aspects, the suit switching module 4552 may be configured to: reduce a size of the associated region image; convert a size-reduced image into a grayscale image; and obtain, from the grayscale image through statistics collection, color proportion data of each color in the associated region image.

In one or more aspects, the suit switching module 4552 may be configured to: determine a color proportion vector of the color proportion data based on a proportion value corresponding to each color in the color proportion data, a value of each dimension of the color proportion vector corresponding to each proportion value in a one-to-one manner; and map, in a dimensionality reduction manner, the color proportion vector to the color vector of the associated region.

In one or more aspects, the suit switching module 4552 may be configured to: before determining the color vector of the associated region of the first component in the first region, determine a color vector of each candidate component by performing the following processing on each candidate component: extracting each mapping material of the candidate component; combining all mapping materials into a candidate component image of the candidate component; converting the candidate component image into color proportion data of the candidate component image; and extracting a color vector of the candidate component from the color proportion data.

In one or more aspects, the suit switching module 4552 may be configured to: reduce a size of the candidate component image; perform grayscale conversion on a size-reduced image obtained through size reduction, to obtain a grayscale image; and count a proportion of each color in the grayscale image to obtain the color proportion data of the candidate component image.

In one or more aspects, the suit switching module 4552 may be configured to: determine a color proportion vector of the color proportion data based on a proportion value corresponding to each color in the color proportion data, a value of each dimension of the color proportion vector corresponding to each proportion value in a one-to-one manner; and map, in a dimensionality reduction manner, the color proportion vector to the color vector of the candidate component.

In one or more aspects, the suit switching module 4552 may be configured to: replace the first component with the second component in response to determining that a replacement limiting condition is met, the replacement limiting condition including at least one of the following: a quantity of suit changes of the first virtual object does not reach a maximum quantity of suit changes; the first virtual object needs to be concealed; stay duration of the first virtual object in the first region is greater than a duration threshold; or an area of the first region is greater than a suit change area threshold.

In one or more aspects, the suit switching module 4552 may be configured to: before replacing the first component with the second component, identify the concealment requirement of the virtual object in the following manner: calling, based on an environmental parameter of the first region and an attribute parameter of the virtual object, a neural network model to perform concealment prediction for the first virtual object to obtain a concealment prediction result indicating whether the first virtual object needs to be concealed, the attribute parameter of the virtual object including at least one of the following: location information of first virtual object, location information of an enemy virtual object of the first virtual object, or location information of teammate virtual object of the first virtual object, and the environmental parameter of the first region including terrain information of the first region and a field of view of the first region.

In one or more aspects, the suit switching module 4552 may be configured to: before calling, based on the environmental parameter of the first region and the attribute parameter of the virtual object, the neural network model to perform concealment prediction for the first virtual object, train the neural network model in the following manner: obtaining an environmental parameter of the virtual scene and battle data of at least two camps, the at least two camps including a losing camp and a winning camp, and the battle data including a location at which a virtual object of the winning camp performs covert behavior, and a location at which a virtual object of the losing camp performs covert behavior; obtaining tagged battle data, the location at which the virtual object of the winning camp performs covert behavior being tagged with a probability 1, and the location at which the virtual object of the losing camp performs covert behavior being tagged with a probability 0; and training an initial neural network model based on the environmental parameter of the virtual scene and the tagged battle data to obtain a trained neural network model.

In one or more aspects, the suit switching module 4552 may be configured to: in response to determining that the color of the first region does not match the color of the first component in the first suit, perform the following processing: in response to determining that the first region is a preset suit change region for the first virtual object and the wearing position corresponding to the first component is a preset wearing position in the preset suit change region, using a preset component associated with the preset wearing position as the second component, and replacing the first component with the second component, a color of the preset component matching the color of the first region.

In one or more aspects, the suit switching module 4552 may be configured to: in response to determining that a global replacement condition is met, replace the entire first suit with a second suit that matches the color of the first region, the global replacement condition including at least one of the following: a corresponding second suit is preset in the first region for the first virtual object; or an overall replacement instruction for the first suit is received.

In one or more aspects, the suit switching module 4552 is configured to: in response to determining that the first virtual object leaves a first region and enters a second region, perform the following processing: if a color difference between the second region and the first region is less than or equal to a color difference threshold, controlling the first virtual object to continue to wear the first suit in the second region; or if a color difference between the second region and the first region is greater than the color difference threshold, replacing the entire first suit with a second suit that matches a color of the second region, and continuing to wear the second suit in the second region.

In one or more aspects, the suit switching module 4552 may be configured to: before replacing the entire first suit with the second suit that matches the color of the second region, if a local replacement condition is not met, perform the processing of replacing the entire first suit with the second suit that matches the color of the second region; or if the local replacement condition is met, replace a third component in the first suit with a fourth component, a color of the fourth component matching the color of the second region, a wearing position for the fourth component being the same as that for the third component, and the local replacement condition including at least one of the following: the first virtual object does not have a corresponding second suit in the second region; a quantity of components that do not match the color of the second region is less than a replacement quantity threshold; or the third component has no binding relationship with other components in the first suit.

In one or more aspects, the suit switching module 4552 may be configured to: in response to determining that the color of the first region does not match the color of the first component in the first suit and the first component does not meet a color change condition, replace the first component with the second component, the color change condition including at least one of the following: a color of each candidate component corresponding to the first component does not match the color of the first region, the candidate component being owned by the first virtual object; the first component has a binding relationship with another component in the first suit; a function of the first component is stronger than that of each candidate component corresponding to the first component; or the function of the first component is associated with a task currently performed by the first virtual object, the second component having no function corresponding to the task currently performed.

In one or more aspects, the suit switching module 4552 may be configured to: in response to determining that the color of the first region does not match the color of the first component in the first suit and the first component meets the color change condition, replace the color of the first component with a target color matching the color of the first region.

In one or more aspects, the virtual scene further includes an opposite-color suit change control; and the suit switching module 4552 may be configured to: in response to determining that the first virtual object does not need to be concealed in the first region and receiving the trigger operation for the opposite-color suit change control, replace the first component, in the first suit, that matches the color of the first region with the fifth component, the fifth component being a component whose color is opposite to the color of the first region, and a wearing position for the fifth component being the same as that for the first component.

In one or more aspects, the suit switching module 4552 may be configured to: before replacing the first component, in the first suit, that matches the color of the first region with the fifth component, among a plurality of candidate components in a same wearing position as the first component, select a candidate component with a lowest color similarity to the first region as the fifth component, the plurality of candidate components being owned by the first virtual object.

In one or more aspects, the display module 4551 may be configured to display or caused to be displayed a virtual scene, the virtual scene including a first virtual object wearing a first suit, the first suit including a plurality of components, the plurality of components being distributed at different positions on the first virtual object, and the virtual scene further including an opposite-color suit change control; and the suit switching module 4552 may be configured to: in response to a trigger operation for the opposite-color suit change control, replace a first component, in the first suit, that matches a color of a first region with a fifth component, the fifth component being a component whose color is opposite to the color of the first region, and a wearing position for the fifth component being the same as that for the first component.

In one or more aspects, the display module 4551 may be configured to display or cause to be displayed a virtual scene, the virtual scene including a first virtual object wearing a first suit, the first suit including a plurality of components, and the plurality of components being distributed at different positions on the first virtual object; and the suit switching module 4552 may be configured to: in response to determining that the first virtual object leaves a first region and enters a second region, perform the following processing: if a color difference between the second region and the first region is greater than a color difference threshold, replacing the entire first suit with a second suit that matches a color of the second region, and continuing to wear the second suit in the second region; or if a color difference between the second region and the first region is less than or equal to the color difference threshold, controlling the first virtual object to continue to wear the first suit in the second region.

In one or more aspects, the first region is not adjacent to the second region, and a third region exists between the first region and the second region; and the suit switching module 4552 may be configured to: when the first virtual object is located in the third region, control the first virtual object to continue to wear the first suit.

In one or more aspects, the suit switching module 4552 may be configured to: perform the processing of controlling the first virtual object to continue to wear the second suit based on a determination that a color distribution difference of the second region is less than or equal to a color difference threshold.

In one or more aspects, the suit switching module 4552 may be configured to: before replacing the entire first suit with the second suit that matches the color of the second region, if a local replacement condition is not met, perform the processing of replacing the entire first suit with the second suit that matches the color of the second region; or if the local replacement condition is met, replace a third component in the first suit with a fourth component, a color of the fourth component matching the color of the second region, a wearing position for the fourth component being the same as that for the third component, and the local replacement condition including at least one of the following: the first virtual object does not have a corresponding second suit in the second region; a quantity of components that do not match the color of the second region is less than a replacement quantity threshold; or the third component has no binding relationship with other components in the first suit.

One or more aspects of this disclosure provide a computer program product or a computer program. The computer program product or the computer program includes computer instructions, and the computer instructions are stored in a non-transitory computer-readable storage medium. One or more processors of a computer device reads the computer instructions from the non-transitory computer-readable storage medium, and the one or more processors executes the computer instructions, so that the computer device performs the suit processing method for a virtual object in one or more aspects of this disclosure.

One or more aspects of this disclosure provide a non-transitory computer-readable storage medium, having executable instructions stored therein. When the executable instructions are executed by one or more processors, the one or more processors are enabled to perform the suit processing method for a virtual object in one or more aspects of this disclosure.

The computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In one or more aspects, the executable instructions may be written in a form of a program, software, a software module, a script, or code based on a programming language in any form (including a compiled or interpretive language, or a declarative or procedural language), and may be deployed in any form, including being deployed as a standalone program, or being deployed as a module, a component, a subroutine, or another unit suitable for use in a computing environment.

In an example, the executable instructions may be deployed on one computing device for execution, or may be executed on a plurality of computing devices at one location, or may be executed on a plurality of computing devices that are distributed at a plurality of locations and that are interconnected through a communication network.

In one or more aspects of this disclosure, at least some components in a suit of a virtual object are replaced with a component that matches an environmental color of a virtual scene. In this way, a component in the suit of the virtual object automatically changes with a color of a scene in a game, a possibility of the virtual object being exposed in the virtual scene is reduced, and adverse interference caused by abundant suit components to a battle is avoided. A user may enable automatic replacement of a concealed suit. This reduces operation and thinking costs in the battle, and improves game experience for the user.

The foregoing descriptions are merely one or more aspects of this disclosure and are not intended to limit the protection scope of this application. Any modification, equivalent replacement, or improvement made without departing from the spirit and scope of this application shall fall within the protection scope of this application.

What is claimed is:

1. A method comprising:

causing to be displayed a virtual scene, the virtual scene comprising a first virtual object located in a first region and wearing a first suit, the first suit comprising a plurality of components distributed at different positions on the first virtual object;

determining that a color of the first region does not match a color of a first component of the plurality of components of the first suit; and replacing, in response to the determining, the first component in the first suit with a second component, wherein the second component is selected based on a color of the second component matching the color of the first region, and a second wearing position of the second component being the same as a first wearing position of the first component.

2. The method according to claim 1, wherein the virtual scene further comprises an automatic suit change control, and wherein the replacing comprises:

displaying the automatic suit change control in an on-state in response to an enabling operation for the automatic suit change control; and automatically replacing the first component in the first suit with the second component in response to the determining that the color of the first region does not match the color of the first component.

3. The method according to claim 1, further comprising:

displaying a manual suit change control in an available state in response to determining that a manual suit change condition is met based on one of: a time interval between a current moment and a suit change moment of a previous suit change being greater than or equal to an interval threshold or a quantity of suit changes of the first virtual object being less than a maximum quantity of suit changes; and replacing the first component with the second component further in response to receiving a trigger operation for the manual suit change control.

4. The method according to claim 1, wherein the virtual scene further comprises a manual suit change control, the method further comprising:

determining that a manual suit change condition is not met based on one of: a time interval between a current moment and a suit change moment of a previous suit change being less than an interval threshold, or a quantity of suit changes of the first virtual object reaching a maximum quantity of suit changes; and displaying the manual suit change control in a disabled state by hiding the manual suit change control, displaying the manual suit change control in gray, or displaying a disabled sign on the manual suit change control.

5. The method according to claim 1, wherein the second component is selected to replace the first component by:

obtaining a plurality of candidate components configured for a same wearing position as the first component; and using a candidate component meeting a screening condition among the plurality of candidate components as the second component, the plurality of candidate components being owned by the first virtual object, and the screening condition comprising one of the following: a function of the candidate component is the same as that of the first component, a wearing position for the first component is not obscured by a virtual environment, or a color similarity between the candidate component and the first region is greater than a color similarity threshold.

6. The method according to claim 5, wherein the color similarity is determined by:

determining a color vector of an associated region of the first component in the first region; or determining a vector distance between a color vector of each candidate component and the color vector of the associated region, the vector distance representing a color similarity between the candidate component and the first region, and the vector distance being negatively correlated with the color similarity.

7. The method according to claim 6, wherein the determining the color vector of the associated region of the first component in the first region comprises:

generating a field-of-view picture image corresponding to the first virtual object;

segmenting the field-of-view picture image based on an associated region of the wearing position for the first component, to obtain an associated region image;

determining color proportion data of the associated region image; and extracting a color vector of the associated region from the color proportion data.

8. The method according to claim 7, wherein the determining the color proportion data of the associated region image comprises:

reducing a size of the associated region image, and converting a size-reduced image into a grayscale image; and generating, from the grayscale image and through statistics collection, color proportion data of each color in the associated region image.

9. The method according to claim 7, wherein the extracting comprises:

determining a color proportion vector of the color proportion data based on a proportion value corresponding to each color in the color proportion data, a value of each dimension of the color proportion vector corresponding to each proportion value in a one-to-one manner; and mapping the color proportion vector to the color vector of the associated region.

10. The method according to claim 6, wherein before the determining a color vector of an associated region of the first component in the first region, the method further comprises determining a color vector of each candidate component by:

extracting each mapping material of the candidate component;

combining the mapping materials into a candidate component image of the candidate component;

converting the candidate component image into color proportion data of the candidate component image; and extracting a color vector of the candidate component from the color proportion data.

11. The method according to claim 10, wherein the converting the candidate component image into color proportion data of the candidate component image comprises:

reducing a size of the candidate component image to generate a size-reduced image;

performing grayscale conversion on the size-reduced image to obtain a grayscale image; and generating, from the grayscale image and through statistics collection, color proportion data of each color in the candidate component image.

12. The method according to claim 10, wherein the converting the candidate component image into color proportion data of the candidate component image comprises:

determining a color proportion vector of the color proportion data based on a proportion value corresponding to each color in the color proportion data, a value of each dimension of the color proportion vector corresponding to each proportion value in a one-to-one manner; and mapping the color proportion vector to the color vector of the candidate component.

13. The method according to claim 1, wherein the replacing the first component with the second component further comprises:

determining that a quantity of suit changes of the first virtual object does not reach a maximum quantity of suit changes;

determining that the first virtual object needs to be concealed;

determining that a stay duration of the first virtual object in the first region is greater than a duration threshold; or determining that an area of the first region is greater than a suit change area threshold.

14. The method according to claim 13, wherein determining that the first virtual object needs to be concealed comprises:

calling, based on an environmental parameter of the first region and an attribute parameter of the first virtual object, a neural network model to determine, for the first virtual object, a concealment prediction result indicating whether the first virtual object needs to be concealed, wherein the attribute parameter of the first virtual object comprises at least one of the following: location information of the first virtual object, location information of an enemy virtual object of the first virtual object, or location information of a teammate virtual object of the first virtual object, and wherein the environmental parameter of the first region comprises terrain information of the first region and a field of view of the first region.

15. The method according to claim 14, wherein before the determining that the first virtual object needs to be concealed, the method further comprises training the neural network model by:

obtaining an environmental parameter of the virtual scene and battle data of at least two camps, the at least two camps comprising a losing camp and a winning camp, wherein the battle data comprises a location at which a virtual object of the winning camp performs covert behavior and a location at which a virtual object of the losing camp performs covert behavior;

obtaining tagged battle data, wherein the location at which the virtual object of the winning camp performs covert behavior is tagged with a probability 1, and the location at which the virtual object of the losing camp performs covert behavior is tagged with a probability 0; and training an initial neural network model based on the environmental parameter of the virtual scene and the tagged battle data to obtain a trained neural network model.

16. The method according to claim 1, wherein the replacing comprises:

in response to determining that the first region is a preset suit change region for the first virtual object and that the first wearing position corresponding to the first component is a preset wearing position in the preset suit change region, selecting a preset component associated with the preset wearing position as the second component, wherein a color of the preset component matches the color of the first region.

17. The method according to claim 1, wherein in response to determining that the first virtual object leaves the first region and enters a second region, the method further comprises:

based on a color difference between the second region and the first region being less than or equal to a color difference threshold, controlling the first virtual object to continue to wear the first suit in the second region; or based on a color difference between the second region and the first region being greater than the color difference threshold, replacing the first suit with a second suit that matches a color of the second region, and controlling the first virtual object to continue to wear the second suit in the second region.

18. The method according to claim 1, wherein the replacing is further performed in response to determining that the color of the first region does not match the color of the first component in the first suit and the first component does not meet a color change condition, wherein the color change condition comprises at least one of the following:

whether a color of each candidate component corresponding to the first component matches the color of the first region, the candidate component being owned by the first virtual object;

whether the first component has a binding relationship with another component in the first suit;

whether a function of the first component is stronger than that of each candidate component corresponding to the first component; or whether the function of the first component is associated with a task currently performed by the first virtual object.

19. An apparatus comprising:

one or more processors;

memory storing computer-readable instructions that, when executed by the one or more processors, causes the apparatus to:

cause to be displayed a virtual scene, the virtual scene comprising a first virtual object located in a first region and wearing a first suit, the first suit comprising a plurality of components distributed at different positions on the first virtual object;

determine that a color of the first region does not match a color of a first component of the plurality of components of the first suit; and replace, in response to determining that the color of the first region does not match the color of the first component of the plurality of components of the first suit, the first component in the first suit with a second component, wherein the second component is selected based on a color of the second component matching the color of the first region, and a second wearing position of the second component being the same as a first wearing position of the first component.

20. A non-transitory computer-readable media storing instructions that, when executed by one or more processors, cause the one or more processors to:

cause to be displayed a virtual scene, the virtual scene comprising a first virtual object located in a first region and wearing a first suit, the first suit comprising a plurality of components distributed at different positions on the first virtual object;

determine that a color of the first region does not match a color of a first component of the plurality of components of the first suit; and replace, in response to determining that the color of the first region does not match the color of the first component of the plurality of components of the first suit, the first component in the first suit with a second component, wherein the second component is selected based on a color of the second component matching the color of the first region, and a second wearing position of the second component being the same as a first wearing position of the first component.

* * * * *